(12) United States Patent
Deyaf et al.

(10) Patent No.: US 12,033,506 B1
(45) Date of Patent: Jul. 9, 2024

(54) SMART EMERGENCY VEHICLE LIGHT SYSTEM PROVIDING DIGITAL ALERTS

(71) Applicant: Feniex Industries, Austin, TX (US)

(72) Inventors: Hamza Deyaf, Austin, TX (US); Kyle Hale, Austin, TX (US); Nicholas Cameron Marth, Austin, TX (US); Aaron Brown, Austin, TX (US); Geoffrey Salazar, Cedar Park, TX (US); Tom Duong, McMahan, TX (US)

(73) Assignee: Feniex Industries, Austin, TX (US)

( * ) Notice: Subject to any disclaimer, the term of this patent is extended or adjusted under 35 U.S.C. 154(b) by 0 days.

(21) Appl. No.: 18/479,729

(22) Filed: Oct. 2, 2023

(51) Int. Cl.
*G08G 1/0965* (2006.01)
*B60Q 1/26* (2006.01)
*G01C 21/34* (2006.01)
*G08G 1/0968* (2006.01)

(52) U.S. Cl.
CPC ............ *G08G 1/0965* (2013.01); *B60Q 1/26* (2013.01); *G01C 21/3415* (2013.01); *G08G 1/096827* (2013.01)

(58) Field of Classification Search
CPC .. G08G 1/0965; G08G 1/096827; B60Q 1/26; G01C 21/3415
USPC ........................................................ 340/902
See application file for complete search history.

(56) References Cited

U.S. PATENT DOCUMENTS

| | | | | |
|---|---|---|---|---|
| 6,317,052 B1 * | 11/2001 | Welling | .................... | G08B 7/06 340/471 |
| 7,061,402 B1 * | 6/2006 | Lawson | ................ | G08G 1/0965 340/901 |
| 7,271,736 B2 * | 9/2007 | Siegel | .................. | G08G 1/0965 340/902 |
| 7,551,102 B1 * | 6/2009 | Carson | ...................... | B60Q 1/52 340/936 |
| 8,258,979 B2 * | 9/2012 | Lemmons | ............ | G08G 1/0965 705/13 |
| 8,325,029 B2 * | 12/2012 | Brooking | .............. | B60Q 1/2611 340/471 |
| 9,986,401 B2 * | 5/2018 | El-Dinary | ............... | H04H 20/62 |
| 10,127,813 B2 * | 11/2018 | Walsh | .................. | G08G 1/0965 |
| 10,887,747 B2 * | 1/2021 | Jackson | ................. | G07C 5/008 |
| 2004/0036627 A1 * | 2/2004 | Knoski | ................ | G08G 1/0965 340/902 |
| 2005/0239436 A1 * | 10/2005 | Bell | ................. | G08G 1/096716 455/404.1 |

(Continued)

*Primary Examiner* — Eric Blount
(74) *Attorney, Agent, or Firm* — Foley IP Law, PLLC

(57) ABSTRACT

Examples provide emergency vehicle warning light device activation digital alerts to recipients. An alert manager monitors activation of smart light devices on an emergency vehicle. When smart light device activation is detected, the alert manager generates a digital alert notification including notification data. The notification data identifies the current location of the emergency vehicle. The notification is transmitted to one or more selected recipients. The notification data in the digital alert notification is used to generate a digital alert on a user interface device or other output device associated with each recipient. The system determines when to provide digital alerts by applying user-configurable rules to notification data for customizable digital alerts to selected recipients. The digital alerts can include emergency vehicle indicators identifying the location of emergency vehicles having activated emergency lights within digital maps displayed to users in vehicles.

20 Claims, 14 Drawing Sheets

(56) References Cited

U.S. PATENT DOCUMENTS

| | | | |
|---|---|---|---|
| 2006/0176190 A1* | 8/2006 | Madison | B60Q 1/52 340/425.5 |
| 2007/0132609 A1* | 6/2007 | Stackelhouse | G08G 1/161 340/904 |
| 2007/0273551 A1* | 11/2007 | Jacobs | G08G 1/161 340/988 |
| 2008/0303660 A1* | 12/2008 | Lombardi | G08G 1/0965 340/540 |
| 2012/0056757 A1* | 3/2012 | Caudill | B60Q 1/52 340/908 |
| 2012/0119900 A1* | 5/2012 | Walther | B60Q 1/268 340/474 |
| 2014/0347179 A1* | 11/2014 | Fleszewski | G08C 17/02 340/468 |
| 2015/0254978 A1* | 9/2015 | Mawbey | B60Q 1/52 340/902 |
| 2015/0371539 A1* | 12/2015 | Hawkins, Sr. | G08G 1/096791 340/902 |
| 2016/0253903 A1* | 9/2016 | Wilk | G08G 1/087 340/902 |
| 2023/0124536 A1* | 4/2023 | Chien | G08G 1/005 455/404.2 |

\* cited by examiner

SMART EMERGENCY VEHICLE LIGHT SYSTEM PROVIDING DIGITAL ALERTS

BACKGROUND

Emergency vehicles frequently use light-based systems to provide visual alerts to drivers that the emergency vehicles are nearby and possibly responding to an emergency event, such as, but not limited to, a firetruck responding to a fire or an ambulance responding to an emergency call. The emergency vehicles typically include one or more surface-mounted lights attached to the exterior surface of the emergency vehicle, such as, light bars on the roof of the emergency vehicle or peripheral lights mounted to the sides of the emergency vehicle. The lights frequently flash in various color combinations and flash patterns intended to attract the attention of motorists and pedestrians. However, in some situations, a person may fail to notice the flashing lights due to other visual distractions in the vicinity. For example, a driver may be distracted by roadside signage, traffic signals, other vehicles on the road, etc. Audible siren sounds may also be provided in some situations. However, these siren sounds may go unnoticed where a vehicle radio is turned on or where a person is hearing disabled. In such cases, visual and audible alerts may be insufficient to notify users of emergency vehicles in the vicinity.

SUMMARY

Some examples provide a system for providing digital alerts corresponding to emergency vehicle light device activations. A smart light device removably attached to at least a portion of a surface of an emergency vehicle. The smart light device includes a set of light emitting diode (LED) lights. A light controller device includes a network device and a memory communicatively coupled to a processor. The system detects a change of an activation state of the smart light device from a de-activated state to an activated state. The smart light device flashes at least one LED light in the set of LED lights in a user-selected flash pattern when the smart light device is in the activated state. The system generates a notification identifying a current location of the emergency vehicle responsive to detecting the change in the activation state of the smart light device. The system provides the notification to a remote computing device via the network device of the smart light device. A digital alert is generated using the notification data. The digital alert includes the current location of the emergency vehicle.

Other examples provide a method for providing digital alerts corresponding to emergency vehicle smart light device activation. A change in activation state of a smart light device to an activated state is detected. A set of lights flash in a selected flash pattern in the activated state. A notification is generated identifying a current location of the emergency vehicle in response to the detected change in activation state. The notification is provided to a selected recipient via a network device of the smart light device. A digital alert is displayed on a user interface device associated with a second vehicle within a predetermined range of the emergency vehicle. The digital alert includes the current location of the emergency vehicle.

Still other examples provide a computer storage device having computer-executable instructions stored thereon. The instructions cause a computing device to detect a change in activation state of a smart light device removably mounted to at least a portion of a surface of an emergency vehicle from a de-activated state to an activated state. A determination is made whether the emergency vehicle is in motion. A notification identifying a current location of the emergency vehicle is generated in response to determining the emergency vehicle is in motion and the smart light device is in the activated state. The notification is provided to a computing device associated with a selected recipient. The computing device generates a digital alert based on the notification. The digital alert is presented to a user via a user interface device associated with the computing device. The digital alert includes the current location of the emergency vehicle.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Figure 1:
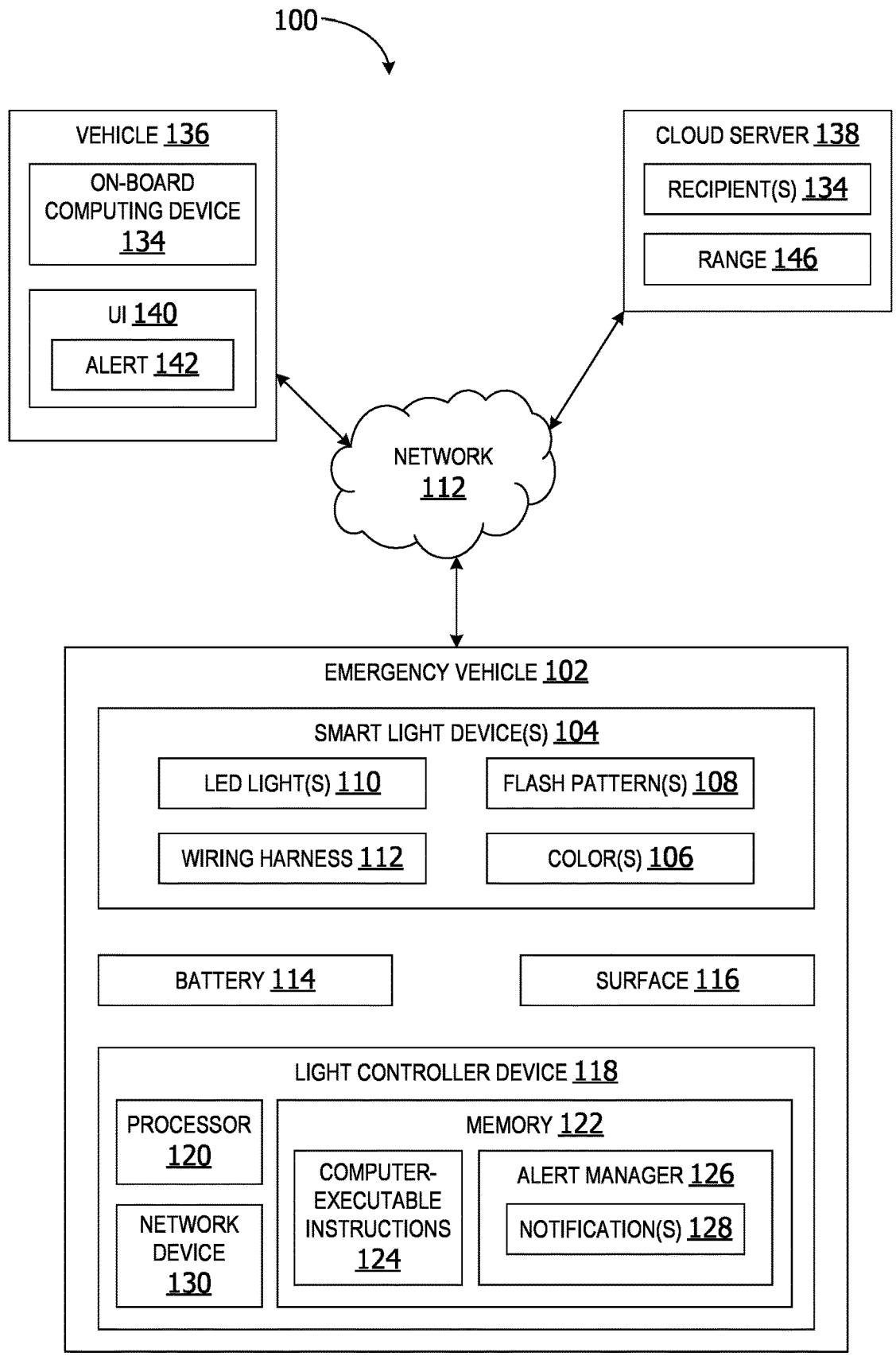
FIG. 1 is an exemplary block diagram illustrating a system for generating digital alerts associated with emergency vehicle light device activation.

A more detailed understanding can be obtained from the following description, presented by way of example, in conjunction with the accompanying drawings. The entities, connections, arrangements, and the like that are depicted in, and in connection with the various figures, are presented by way of example and not by way of limitation. As such, any and all statements or other indications as to what a particular figure depicts, what a particular element or entity in a particular figure is or has, and any and all similar statements, that can in isolation and out of context be read as absolute and therefore limiting, can only properly be read as being constructively preceded by a clause such as "In at least some examples, . . . " For brevity and clarity of presentation, this implied leading clause is not repeated ad nauseum.

Emergency vehicles responding to an emergency or other event, typically alert drivers of vehicles in the vicinity of the emergency vehicle using visual alerts provided via emergency warning lights on the vehicle and/or audible alerts provided by sirens. However, these visual and audible alerts are becoming less effective at providing warning to drivers where navigation applications, music, podcasts, roadside digital billboards, and other information sources are competing for the driver's attention.

Referring to the figures, examples of the disclosure enable digital alerts to user devices associated with drivers within the vicinity of emergency vehicles having their emergency warning light device(s) activated indicating the emergency vehicle is responding to an emergency or other potentially hazardous event. The digital alerts are presented in such a manner that supplements the visual and audible alerts provided by the emergency vehicle flashing lights and sirens. The digital alerts are presented to the driver via a user interface which improves driver response time and rates of driver response to the presence of emergency vehicles on roadways, such as by increasing the number of vehicle which pull over to the side of the road enabling emergency vehicles to pass other vehicles safely and quickly on the roadway without accidents.

In some examples, an alert manager generates a notification when a smart light device on an emergency vehicle is activated. The alert manager includes the current location of the emergency vehicle in the notification. The notification is provided to a computing device associated with a designated recipient, such as, but not limited to, an on-board computing device within a vehicle or user device associated with a driver or passenger. The computing device displays a digital alert, including the current location of the emergency vehicle to the user via a user interface device, in addition to the visual alert provided by the smart light devices on the emergency vehicle. In this manner, if a driver or passenger in a vehicle fails to notice the visual alert provided by the emergency lights, the system provides a digital alert to ensure all drivers are aware of an emergency vehicle within a vicinity of the drivers. This provides additional security and safety for the emergency vehicles and non-emergency vehicles within range of the emergency vehicles. Moreover, the digital alerts reduce the number of traffic accidents while enabling faster response times for emergency vehicles.

In other examples, the system provides a light controller device which monitors activation and de-activation of emergency lights on an emergency vehicle. The light controller device generates a notification including the current location of the emergency vehicle when the emergency lights are activated on the emergency vehicle. The light controller transmits the notification with the current location data of the emergency vehicle to other vehicles and/or user devices within a predetermined range of the emergency vehicle, which can be updated in real-time as the emergency vehicle travels. In this manner, user are provided with visual alerts via the light devices, audible alerts via the emergency vehicle sirens, and digital alerts via the on-board vehicle computing devices and/or user devices within vehicles located within a given range of the emergency vehicle for improved safety, prevention of traffic jams, reduction in traffic accidents, increased emergency vehicle response time, and smoother traffic flow around emergency vehicles which may be stationary or in motion on roadways.

The light controller device operates in an unconventional manner by monitoring activation and de-activation of emergency lights on emergency vehicles and notifies computing devices associated with designated recipients. In this manner, the light controller device is used in an unconventional way and allows provision of real-time digital alerts associated with emergency vehicles responding to emergency situations to other emergency vehicles, as well as non-emergency vehicles, within range of the responding emergency vehicles, thereby improving the ability of emergency vehicles to alert other vehicles of their presence during an emergency situation.

Referring again to FIG. 1, an exemplary block diagram illustrates a system 100 for generating digital alert notifications associated with emergency vehicle light device activation. The digital alert notification is transmitted to recipient computing systems which use the digital alert notification data to generate and display digital alerts to the recipients.

In some examples, an emergency vehicle 102 includes a set of smart light device(s) 104. The emergency vehicle 102 is any type of vehicle having emergency lights used to respond to an emergency event, render aide, or otherwise provide emergency services. The emergency vehicle 102 also includes vehicles utilized by construction workers, utility workers, repair crews, and other service providers working in hazardous conditions.

The emergency vehicle 102 is any type of vehicle used to respond to emergencies and/or provide services in hazardous conditions, such as road vehicles, off-road vehicles, boats, helicopters, and/or amphibious vehicles. The emergency vehicle 102, in other examples includes police helicopters, search and rescue boats, etc. The emergency vehicle 102 includes both marked and unmarked vehicles. The emergency vehicle 102, in some examples, includes police cars, highway patrol vehicles, police motorcycles, firetrucks, ambulances, tow trucks, search and rescue vehicles, utility vehicles, construction vehicles, etc.

The emergency vehicle includes one or more smart light device(s) 104 providing one or more lights capable of flashing one or more light color(s) 106 in one or more flash pattern(s) 108. A smart light device is a light device capable of flashing one or more colors in one or more flash patterns to improve visibility for emergency vehicles. A smart light device may be referred to as an emergency light device, a warning light device, and/or a surface mounted light device on an emergency vehicle. The smart light device is a light device including LED lights mounted on an exterior surface of an emergency vehicle for indicating an emergency or event, such as an emergency light bar, emergency light stick, emergency peripheral lights, etc. The smart light device does not include vehicle headlights, taillights, turn signal lights, or brake lights. However, the examples are not limited to LED lights. In other examples, the emergency light device optionally includes one or more non-LED lights.

The smart light device(s) 104 include one or more lights which are attached to an exterior surface of the emergency vehicle 102, such as, but not limited to, a light bar on a roof of the emergency vehicle 102 and/or peripheral light(s)

attached to any exterior surface of the emergency vehicle. Peripheral light(s) include lights attached to a side of the emergency vehicle, a front of the emergency vehicle, a back end of the emergency vehicle, or any other surface of the emergency vehicle. The smart light device(s) 104, in some examples, includes perimeter lights, light bars, and light sticks.

The smart light device(s) 104, in other examples, include a set of one or more light emitting diode (LED) light(s) 110 in each light device. The LED light(s) include single color LED lights, dual color LED lights, tri-color LED lights, quad color LED lights, as well as lights having five or more LED light colors in each light device. The light device(s) 104 removably attach to at least a portion of the exterior surface 116 of the emergency vehicle, such as, but not limited to, the exterior surface of the body of the emergency vehicle, such as the roof, door, grill, door frame, side, back bumper, etc.

The smart light device(s) 104 are connected to a power source via a wiring harness 112. The wiring harness 112 provides electrical power to the smart light device(s) 104 from the power source. The power source in this examples is a vehicle battery 114. In other examples, the power source optionally includes solar panel(s) for generating solar power or any other available power source associated with the emergency vehicle 102.

The emergency vehicle 102, in this example, includes a light controller device 118. The light controller device 118 has at least one processor 120 and a memory 122. The processor 120 includes any quantity of processing units and is programmed to execute computer-executable instructions 124. The computer-executable instructions 124 are performed by the processor 120, performed by multiple processors within the light controller device 118 or performed by a processor external to the light controller device 118. In some examples, the processor 120 is programmed to execute instructions such as those illustrated in the figures (e.g., FIG. 13 and FIG. 14).

The memory 122 includes any quantity of computer-readable media associated with or accessible by the light controller device 118. The memory 122 in these examples is internal to the light controller device 118 (as shown in FIG. 1). In other examples, the memory 122 is external to the light controller device 118 (not shown) or both (not shown).

The memory 122 stores data, such as one or more applications. The applications, when executed by the processor 120, operate to perform functionality on light controller device 118 and/or the smart light device(s) 104. The applications can communicate with counterpart applications or services such as web services accessible via a network 132. In an example, the applications represent downloaded client-side applications that correspond to server-side services executing in a cloud.

In some examples, the memory 122 stores an alert manager 126. The alert manager 126 detects activation of one or more smart light device(s) 104. When activated, a smart light device flashes a combination of one or more colors in a selected flash pattern. The alert manager generates 126 one or more digital alert notification(s) 128 when the smart light device(s) 104 are activated. The digital alert notification 128 is a notification transmitted to a primary recipient computing device and providing notification data used by the recipient computing device to generate and/or display a digital alert to a user. The notification(s) 128 includes the current location of the emergency vehicle 102. The notification(s) 128 are transmitted by the primary recipient computing device to one or more selected secondary recipient(s) 148. The notification data in the notification(s) is used by the secondary recipient computing devices to render/display the digital alert to one or more users via a user interface device. However, in other examples, the alert manager 126 transmits the notification directly to one or more computing systems associated with the selected recipient(s) 148.

In an example scenario, the alert manager 126 transmits the digital alert notification(s) 128 to a cloud server 138 associated with a primary recipient. The cloud server 138 transmits the digital alert notification(s) 128, including notification data, to the secondary recipient(s) 148 that are within a predetermined range 146 of the emergency vehicle 102 when the emergency vehicle 102 is in motion (driving/moving) or otherwise responding to an emergency within range of the recipient(s). In this example, the recipient(s) 148 includes the user 144. In response, the recipient(s) computing system, such as the on-board computing device 134, displays the notification data within a digital alert 142 displayed to the user via a digital display on an output device, such as the user interface (UI) 140.

The network 132 is implemented by one or more physical network components, such as, but without limitation, routers, switches, network interface cards (NICs), and other network devices. The network 132 is any type of network for enabling communications with remote computing devices, such as, but not limited to, a cellular network, a local area network (LAN), a subnet, a wide area network (WAN), a wireless (Wi-Fi) network, or any other type of network. In this example, the network 132 is a WAN, such as the Internet.

The light controller device 118 includes a network device 130. The network device 130 enables the light controller device 118 to communicate with one or more other remote devices via the network 132, such as, but not limited to, an on-board computing device 134 of a vehicle 136 and/or a cloud server 138.

The vehicle 136 is a vehicle associated with a recipient of the digital alert 142. The vehicle 136 in some examples is a non-emergency vehicle associated with a user 144 which is not an emergency services personnel. In such cases, the digital alert enables the user 144 to take appropriate action, such as pulling over to the side of the road as the emergency vehicle 102 passes by or reroute their travel to avoid the emergency vehicle.

In other examples, the vehicle 136 is another emergency vehicle receiving the digital alert notification which enables the recipient computing device receiving the notification to present a digital alert to the user via an application, such as, but not limited to, a navigation application. The navigation application is any type of application for assisting a driver, such as, but not limited to, a global positioning system (GPS) application. For example, a navigational application can include Google® maps, Apple® maps, TomTom®, Ways®, or any other type of navigation application providing maps and/or driving directions. However, the examples are not limited to displaying digital alerts in navigation applications. The digital alerts can be provided to users via any application, such as, but not limited to, messaging applications, social media applications, etc.

In these examples, the digital alert enables the emergency services personnel associated with multiple emergency vehicles to coordinate their activities in a manner that maximizes resource usage while minimizing costs. For example, if an ambulance is responding to a medical emergency associated with a car accident, another emergency vehicle receiving the digital alert notification may choose to assist by rerouting to the current location of the ambulance indicated in the digital alert 142 presented to the recipient.

The cloud server 138 is a logical server providing services to the computing device light controller device 118, the computing device 134, and/or a user device, such as, but not limited to, the user device 220 in FIG. 2 below. The cloud server 138 is hosted and/or delivered via the network 132. In some non-limiting examples, the cloud server 138 is associated with one or more physical servers in one or more data centers. In other examples, the cloud server 138 is associated with a distributed network of servers.

The on-board computing device 134 represents any device executing computer-executable instructions (e.g., as application programs, operating system functionality, or both) to implement the operations and functionality associated with the computing device 134. The computing device 134 connects the network 132 via a router or other network device located on the vehicle 136. In some examples, the vehicle 136 includes the UI 140 for displaying digital alerts to a user 144, such as, but not limited to, the digital alert 142.

The digital alert 142 is an alert presented to the user to notify the user 144 as to a location of the emergency vehicle 102 when one or more of the smart light device(s) 104 are turned on (activated). The digital alert 142 is not displayed to the user when all the smart light device(s) 104 are turned off (de-activated).

In some examples, the digital alert 142 includes an emergency vehicle indicator displayed on a digital map identifying the current location of the emergency vehicle on the digital map. In other examples, the digital alert 142 provides a pop-up alert on a digital display presented via the UI 140. The pop-up alert includes an identification of the current location of the emergency vehicle 102.

The system, in some examples, triggers automatic digital notifications to certain recipients via applications, such as navigational applications, vehicle status applications presenting vehicle status information via a vehicle dashboard display screen, and/or other emergency vehicle systems. The digital alerts are provided when an emergency vehicle light bar or other surface mounted emergency warning light device is activated. The system provides customizable features options regarding when the notifications are sent, which recipients receive them, and what information is included in the digital alerts presented to drivers and other recipients of the digital alerts. The options are user-configurable rules stores in a set of rules applied by the alert manager to determine when to generate alert notifications, what data to include in the notification and other parameters for the digital alert, such as, the set of rules 246 in FIG. 2 below. The notifications enable digital alerts to be provided to users alerting them that an emergency is occurring at the indicated location, or an emergency vehicle is in the area responding to an emergency.

The digital alert is updated at regular time intervals, in some examples. The time interval is a user-configurable amount of time specified in a set of user-defined rules, such as the set of rules 246 in FIG. 2 below. The digital alert notification is transmitted by the alert manager at regular time intervals providing updated information regarding the changing location of an emergency vehicle in transmit to the location of an emergency, enabling the application or vehicle computing system to update the digital alert presented to the user. Each updated digital alert notification provides a new current location of the emergency vehicle and; or any updated information regarding the state of the emergency, such as updated recommended actions for the recipient to take regarding the emergency. The digital alert displayed on the UI is updated at regular intervals providing real-time information describing the changing location of emergency vehicles in the area. In one example, the digital alert updates every second, every three seconds, every five seconds, or any other time interval.

In this example, the digital alert is provided to a non-emergency vehicle 136. In other examples, the digital alerts are provided to emergency vehicles as well as non-emergency vehicles. In such cases, the digital alerts enable emergency vehicles to coordinate activities. For example, an emergency vehicle receiving a digital alert from another emergency vehicle may choose to assist the emergency vehicle transmitting the digital alert notification.

In other examples, the digital alerts have priority levels or alert levels output with the digital alert. For example, digital alerts customizable options enable the user to configure the system to provide a priority indicator with the digital alert. The priority indicator includes any type of ranking or classification, such as, but not limited to, a high priority digital alert and a low priority digital alert.

In some examples, the high priority (highest level) digital alert is provided in situations having a higher risk or danger associated with the event. In other examples, a high priority is provided for some flash patterns while low priority is provided for other flash patterns. For smart light device flash patterns, such as the attack flash pattern, a high priority digital alert is provided. Other flash patterns, such as scene lighting or spotlight, a low priority digital alert is provided.

In another example, if the smart light device is activated without activation of a siren on the vehicle, a low priority digital alert is provided. If the siren is activated simultaneously, the digital alert is higher priority. In these examples, the smart light device alert manager receives data indicating whether a siren device is activated in conjunction with the light bar. If the siren is not activated but the emergency light is turned on, the digital alert is lower priority or not provided at all.

The high priority digital alert, in some examples, has a different look and/or is accompanied by a high priority graphical indicator or high priority text warning indicating the emergency is a higher level. The high priority digital alert, in other examples, is accompanied by colors like red, orange, yellow. The high priority digital alert in other examples includes larger text font and/or larger emergency vehicle icons than the low priority digital alert. Likewise, the high priority digital alert may refresh or update emergency information and/or current location of the emergency vehicle more frequently (shorter time interval) than the low priority digital alert. The high level/high priority alert indicates greater risk, greater severity of danger, a higher number of emergency vehicles, etc. For example, a category five hurricane is paired with a high priority digital alert, while a single ambulance responding to a residence is coupled with a low-level digital alert, indicating lower impact on motorists.

In this example, the network device is integrated within the smart light device. However, in other examples, the network device is incorporated within a conversion device which is attachable to a pre-existing smart light device. In this manner, a legacy smart light device which is not equipped originally with an alert manager component and network device can be converted or upgraded via the conversion device. In this example, the conversion device acts as the light controller device monitoring activation status of the smart light device. When the light device is activated, the conversion device generates the digital alert notification and transmits the digital alert notification to the one or more recipients via the network. Thus, enabling pre-existing legacy light devices to be converted into smart light devices capable of triggering digital alerts to drivers, thereby improving human-computer interaction via the user interface.

Figure 2:
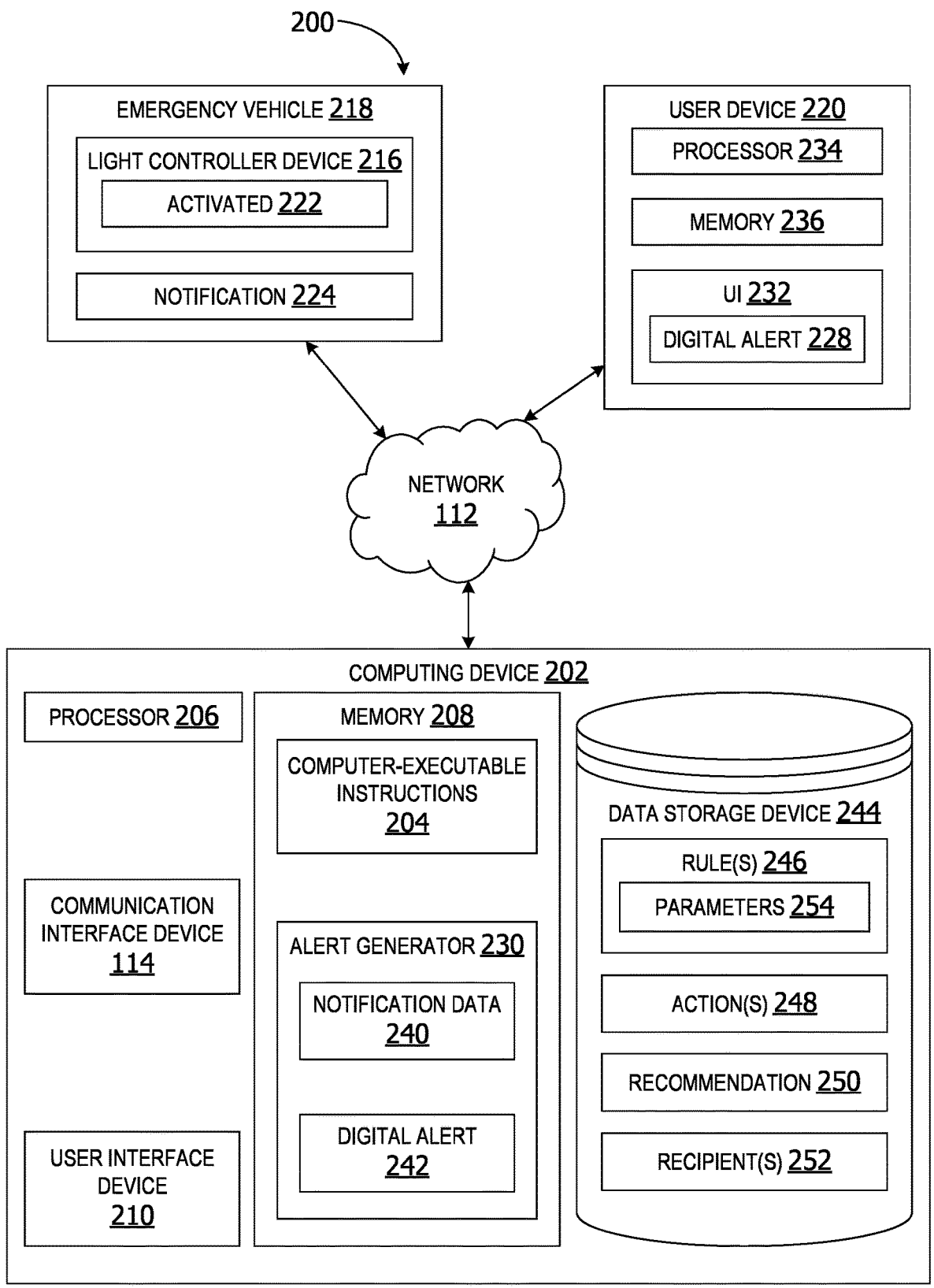
FIG. 2 is an exemplary block diagram illustrating a system for generating notifications identifying a location of emergency vehicles in an emergency light activation state.

FIG. 2 is an exemplary block diagram illustrating a system 200 for generating notifications identifying a location of emergency vehicles in an emergency light activation state. In the example of FIG. 2, the computing device 202 represents any device executing computer-executable instructions 204 (e.g., as application programs, operating system functionality, or both) to implement the operations and functionality associated with the computing device 202. The computing device 202, in some examples, includes a mobile computing device or any other portable device. A mobile computing device includes, for example but without limitation, a mobile telephone, laptop, tablet, computing pad, netbook, gaming device, and/or portable media player. The computing device 202 can also include less-portable devices such as servers, desktop personal computers, kiosks, or tabletop devices. Additionally, the computing device 202 can represent a group of processing units or other computing devices.

In some examples, the computing device 202 has at least one processor 206 and a memory 208. The computing device 202, in other examples includes a user interface component 210.

The processor 206 includes any quantity of processing units and is programmed to execute the computer-executable instructions 204. The computer-executable instructions 204 are performed by the processor 206, performed by multiple processors within the computing device 202 or performed by a processor external to the computing device 202. In some examples, the processor 206 is programmed to execute instructions such as those illustrated in the figures (e.g., FIG. 13 and FIG. 14).

The computing device 202 further has one or more computer-readable media such as the memory 208. The memory 208 includes any quantity of media associated with or accessible by the computing device 202. The memory 208, in these examples, is internal to the computing device 202 (as shown in FIG. 2). In other examples, the memory 208 is external to the computing device (not shown) or both (not shown).

The memory 208 stores data, such as one or more applications. The applications, when executed by the processor 206, operate to perform functionality on the computing device 202. The applications can communicate with counterpart applications or services such as web services accessible via a network 212. In an example, the applications represent downloaded client-side applications that correspond to server-side services executing in a cloud.

In other examples, the user interface component 210 includes a graphics card for displaying data to the user and receiving data from the user. The user interface component 210 can also include computer-executable instructions (e.g., a driver) for operating the graphics card. Further, the user interface component 210 can include a display (e.g., a touch screen display or natural user interface) and/or computer-executable instructions (e.g., a driver) for operating the display. The user interface component 210 can also include one or more of the following to provide data to the user or receive data from the user: speakers, a sound card, a camera, a microphone, a vibration motor, one or more accelerometers, a BLUETOOTH® brand communication module, wireless broadband communication (LTE) module, global positioning system (GPS) hardware, and a photoreceptive light sensor. In a non-limiting example, the user inputs commands or manipulates data by moving the computing device 202 in one or more ways.

The network 212 is a network, such as, but not limited to, the network 132 in FIG. 1. The network 212 is implemented by one or more physical network components, such as, but without limitation, routers, switches, network interface cards (NICs), and other network devices. The network 212 is any type of network for enabling communications with remote computing devices, such as, but not limited to, a local area network (LAN), a subnet, a wide area network (WAN), a wireless (Wi-Fi) network, or any other type of network. In this example, the network 212 is a WAN, such as the Internet. However, in other examples, the network 212 is a local or private LAN.

In some examples, the system 200 optionally includes a communications interface device 214. The communications interface device 214 includes a network interface card and/or computer-executable instructions (e.g., a driver) for operating the network interface card. Communication between the computing device 202 and other devices, such as but not limited to a light controller device 216 on an emergency vehicle 218 and/or a user device 220, can occur using any protocol or mechanism over any wired or wireless connection. In some examples, the communications interface component 214 is operable with short range communication technologies such as by using near-field communication (NFC) tags.

The light controller device 216 is a device including a processor, a memory, and a network device, such as, but not limited to, the light controller device 118 in FIG. 1. The light controller device 216 detects a change in activation state of a smart light device to an activated state. A set of one or more emergency lights flash in a selected flash pattern when activated 222 (in the activated state).

In some examples, the alert manager executing on the light controller device 216 determines whether the emergency vehicle is in motion. The light controller device 216 generates a digital alert notification 224 identifying a current location of the emergency vehicle if the emergency vehicle is in motion and the smart light device is in the activated state. In other examples, the notification 224 is generated if one or more smart light devices are activated on the emergency vehicle 218, regardless of whether the emergency vehicle is in motion or stationery. A vehicle is stationary if the vehicle is parked or otherwise not moving/driving. In other examples, the notification is only generated if the emergency vehicle is in motion while the emergency vehicle light(s) are activated 222.

The light controller device 216 provides the digital alert notification to a selected recipient 226 via the network 212. In some examples, the recipient 226 is a user that has registered or subscribed to a digital alert service to receive digital alerts. In other examples, the recipient 226 is a user viewing a navigation application or other application which receives the notification 224 from an alert generator 230 on the computing device. In still other examples, the notification 224 is transmitted to the alert generator 230 on the computing device 202. The alert generator 230 obtains location data and other emergency-related information from the notification 224. The alert generator 230 uses the location data and other emergency-related information to generate the digital alert 228. The alert generator 230 then transmits the digital alert 228 to the user device 220 for display to the user via a UI 232.

The digital alert 228, in some examples, includes an indicator identifying the current location of an emergency vehicle and/or other emergency-related information displayed on a graphical user interface, such as, but not limited to, the UI 232 of the user device 220 and/or a user interface associated with another vehicle, such as the UI 140 on the vehicle 136. In other examples, the digital alert 228 is only presented to recipient computing devices, accounts, and/or applications that have opted-in to receive the digital alerts and are currently located within a predetermined range of the emergency vehicle 218 which has their emergency lights activated 222.

In some examples, the digital alert 228 is a graphical alert indicating the current location of the emergency vehicle 218. The digital alert optionally includes additional emergency-related information, such as, an identification of the type of the emergency vehicle, an identification of the type of emergency, direction of travel of the emergency vehicle, estimated time for the emergency vehicle to reach the recipient's current location, a recommended action for the user to take, etc. The type of vehicle includes a firetruck, police vehicle, highway patrol, ambulance, tow truck, utility vehicle, construction vehicle, search, and rescue vehicle, etc. The type of the emergency can include a medical emergency, weather-related emergency, a vehicle collision/car accident, missing person (amber alert), fire, downed power line, flooding, damaged infrastructure, disabled vehicle, hazardous material spill, etc.

The user device 220 represents any device executing computer-executable instructions. The user device 220 can be implemented as a mobile computing device, such as, but not limited to, a wearable computing device, a mobile telephone, laptop, tablet, computing pad, netbook, gaming device, and/or any other portable device. The user device 220 includes at least one processor 234 and a memory 236. The user device 220 can also include the UI 232. In this example, the user device 220 is associated with a recipient 226 of the digital alert 228 located within range of the emergency vehicle 218.

In some examples, the alert generator 230 obtains notification data 240, including the current location of the emergency vehicle, from the notification 224 received from the light controller device 216. The alert generator 230 utilized the notification data 240 to generate the digital alert 242. The digital alert 242 is a digital alert notifying a user (recipient) regarding the proximity of an emergency vehicle having emergency lights activated indicating the emergency vehicle is likely in process of responding to an emergency situation or other potentially hazardous condition or situation. The digital alert is transmitted to one or more recipients via the network 212. The digital alert is presented to the recipient(s) via the UI 232 or other output device capable of displaying a digital alert. The digital alert is provided via the UI on any computing device, such as, but not limited to, a smart watch, smart phone, dashboard display screen in a vehicle, laptop, table computing device, etc.

In this example, the alert generator is a software application on a third-party server, such as the cloud server. The third-party server transmits the digital alert to the recipient computing device associated with a recipient in a vehicle within range of the emergency vehicle. However, in other examples, the digital alert generator is an application on the recipient computing device associated with a recipient in a vehicle within range of the emergency vehicle. In these examples, the alert manager transmits the notification directly to the recipient computing device associated with the vehicle that is within range of the emergency vehicle. In other words, the digital alert notification is sent directly to a recipient associated with a vehicle within range of the emergency vehicle. An alert generator application on a computing device of the recipient receives the notification and uses the notification data from the digital alert notification to generate the digital alert on the computing device for presentation to the recipient.

The system 100 can optionally include a data storage device 244 for storing data, such as, but not limited to rules(s) 246 for determining if and when to provide a digital alert to users, action(s) 248 or recommendation(s) 250 provided to recipients, as well as a list of recipient(s) 252 or potential recipient(s) of the digital alert. In other words, the rules are used to determine when to send the digital alert, what information to include in the digital alert, who should receive the digital alert, whether to send updates, whether to send an alert termination notice, etc.

The rules 246 include one or more parameters 254 applied to the notification data 240 to determine whether a digital alert notification should be generated and sent out to one or more recipients. The recipient can include a third-party service and/or individual users within range of the emergency vehicle.

In one example, the rules 246 state that a digital alert notification should only be sent if an emergency light is activated while the emergency vehicle is in motion. If the vehicle is parked, no digital alert notification should be sent. In another example, the rules can include a requirement that the digital alert notification should only be sent if the emergency vehicle light device(s) are activated, and the emergency vehicle speed exceeds a threshold minimum speed. In still another example, the rules optionally include a parameter stating that a recipient only receive digital notifications if the recipient has opted-in to receive the digital alerts within a navigation application or other application. In another example, the rules specify no digital alert is provided to recipients that have opted-out of receiving the digital alerts.

Another example includes a rule that digital alerts notifications are only sent to recipients in response to specific flash patterns being activated on the smart light device(s). In this example, the digital alert notification is sent out if a smart light device is activated and a user has selected a specific flash pattern, such as a first flash pattern. If the user selects a different flash pattern (second flash pattern), the digital alert notification is not sent out to recipients.

In another example, digital alert notifications are only sent to recipients if the light device is activated while the emergency vehicle is located within certain areas. If the emergency vehicle is located outside the designated alert areas, no digital alert is provided. For example, the system may only send out digital alert notifications if the emergency vehicle is traveling on a paved, public road. In these examples, if the emergency vehicle is located on a private road, unpaved road, or other remote areas, no digital alert notification is sent out.

The action(s) 248 include one or more actions or behaviors which the system can suggest to a driver of a vehicle during a digital alert presentation. An action can include pulling over to the left side of the road, bringing the vehicle to a stop until the emergency vehicle passes by, following a detour, exiting a freeway via an off-ramp, pulling into a parking lot, turning on emergency blinkers, turning on headlights, etc. The action(s) 248 are displayed, in some examples, with the current location of the emergency vehicle via the UI as while the digital alert is being presented to the user/recipient.

The recommendation 250 is a recommendation provided to the user with the digital alert. For example, if the digital alert includes the location of several firetrucks responding to a wildfire in the vicinity, the digital alert 228 optionally includes a recommendation 250 for the driver of a non-emergency vehicle to re-route away from the wildfires and/or in a direction away from the direction the fire is moving. The recommendation may also include instructions such as roll-up windows, stay on paved roadways, evacuate the area, etc.

The data storage device 244 can include one or more different types of data storage devices, such as, for example, one or more rotating disks drives, one or more solid state drives (SSDs), and/or any other type of data storage device. The data storage device 244 in some non-limiting examples includes a redundant array of independent disks (RAID) array. In some non-limiting examples, the data storage device(s) provide a shared data store accessible by two or more hosts in a cluster. For example, the data storage device may include a hard disk, a redundant array of independent disks (RAID), a flash memory drive, a storage area network (SAN), or other data storage device. In other examples, the data storage device 244 includes a database.

The data storage device 244 in this example is included within the computing device 202, attached to the computing device, plugged into the computing device, or otherwise associated with the computing device 202. In other examples, the data storage device 244 includes a remote data storage accessed by the computing device via the network 212, such as a remote data storage device, a data storage in a remote data center, or a cloud storage.

Figure 3:
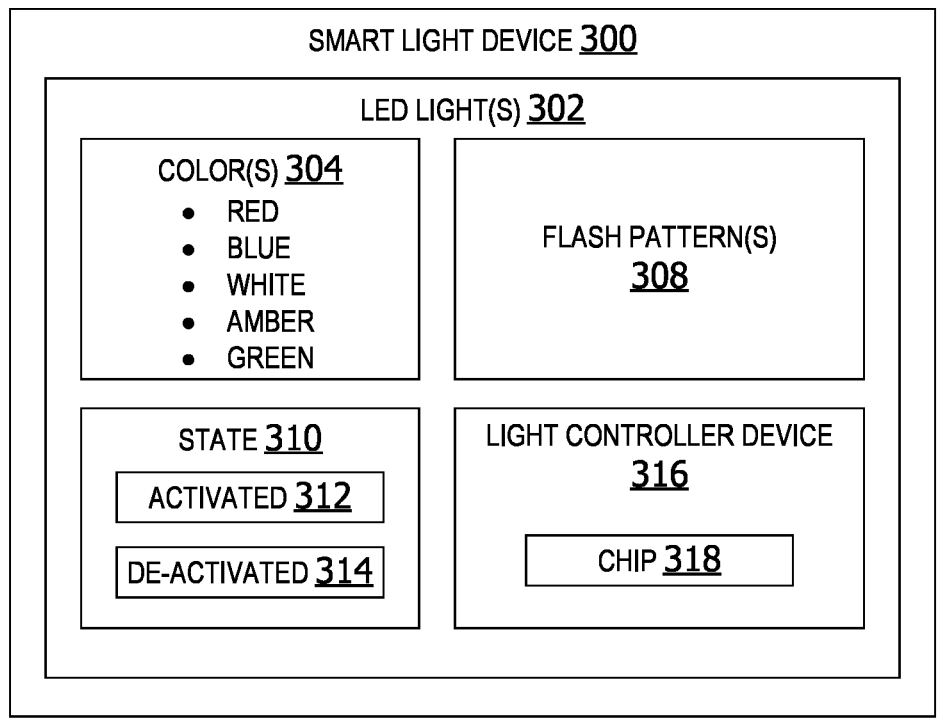
FIG. 3 is an exemplary block diagram illustrating an emergency vehicle light device having a light device controller generating light device activation notification(s).

FIG. 3 is an exemplary block diagram illustrating a smart light device 300 having a light device controller generating light device activation notification(s). The light device 300 is a smart light device, such as, but not limited to, the light device(s) 104 in FIG. 1.

The smart light device 300, in some examples, includes a set of one or more LED light(s) 302 having one or more color(s) 304 capable of flashing combination(s) 306 in one or more flash pattern(s) 308. The color(s) 304 including, without limitation, red, white, blue, and amber. However, the examples are not limited to these four colors. In other examples, the color(s) can include orange, yellow, or any other color.

The color(s) flash in color combination(s) 306 of two or more colors, such as blue and red, red, and white, amber, and white, etc. The colors can flash in combinations of two colors, three colors, as well as combinations of four or more colors while flashing in one or more flash patterns 308.

The LED light(s) have a state 310 indicating whether the LED light(s) are turned on or turned off. When turned on, the light device state is activated 312. When turned off, the state is a de-activated 314 state.

The light controller device 316 is a device for monitoring the activation state of one or more smart light devices and generating digital alert notifications, such as, but not limited to, the light controller device 118 in FIG. 1 and/or the light controller device 216 in FIG. 2. In this example, the light controller device 316 includes a cellular chip 318 enabling the light controller device to transmit digital alert notifications via a network, such as, but not limited to, the network 132 in FIG. 1 and/or the network 212 in FIG. 2.

Figure 4:
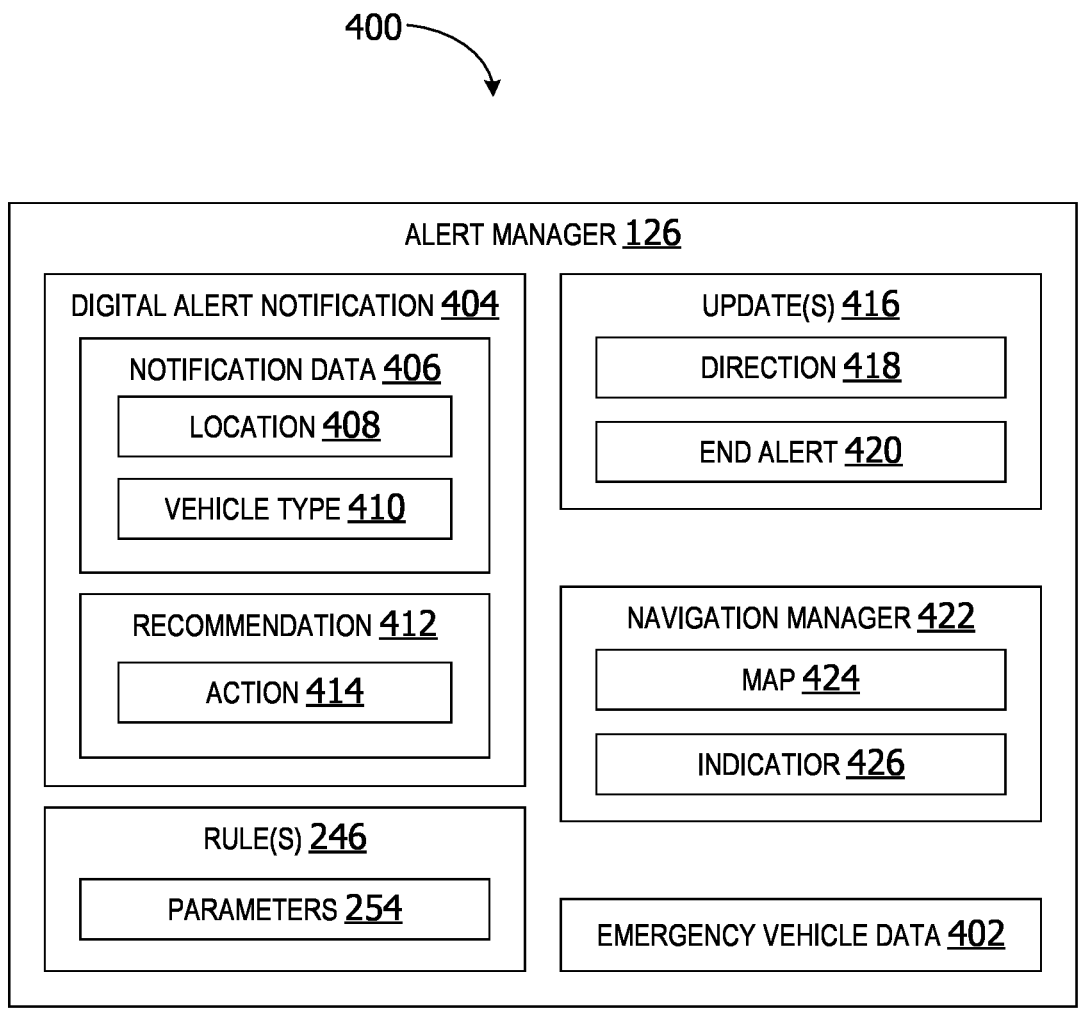
FIG. 4 is an exemplary block diagram illustrating an alert manager for generating digital alerts based on light device activation notification(s).

Turning now to FIG. 4, an exemplary block diagram illustrating an alert manager 126 for generating digital alerts based on light device activation notification(s) is shown. The alert manager 126 in some examples includes a set of rules(s) 246 having one or more parameters 254 which are applied to emergency vehicle data 402 associated with the activation of one or more smart light device(s) on a given emergency vehicle. The rule(s) 246 include parameters related to factors, such as, speed of the emergency vehicle, direction of travel, type of flash pattern, date, time, area/location of the emergency vehicle, whether digital alerts have been manually disabled, etc.

For example, the rules can include a parameter specifying that digital alert notifications are not sent if the digital alert service has been manually disabled. The service is manually disable in some examples where a user engages a switch or lever within the passenger compartment to manually disable transmission of digital alert notifications to recipients. In other examples, the user prevents transmission of digital alert notifications by selecting a programmable option on an on-board computing device, user device or other computing device communicatively coupled to the light controller device.

In another example, the rules 246 specify notifications are sent to vehicles driving in a direction of travel that is the same direction as the emergency vehicle, but the notifications are not sent to vehicles driving in the opposite direction or otherwise moving away from the emergency vehicle.

In yet another example, the rules optionally specify a user-configurable range within which notifications are sent. In other words, notifications are only sent to vehicles or computing devices associated with users/vehicles within the user-configurable range of the emergency vehicle. In one example, if the range is one mile, the digital alerts are provided to recipients within the one-mile range, but the digital alerts are not provided to recipients more than one mile away.

The emergency vehicle data 402 is data related to the emergency vehicle which is sending out the digital alert notification 404. The emergency vehicle data 402 identifies information, such as, but not limited to, the type of vehicle, location of the vehicle, speed, direction of travel, time, etc. The alert manager 126 applies the rules(s) to the emergency vehicle data to determine whether to generate the digital alert notification 404.

The digital alert notification 404 is a notification generated by the alert manager when a smart light device is activated on the emergency vehicle, such as, but not limited to, the notification(s) 128 in FIG. 1 and/or the notification 224 in FIG. 2. The digital alert notification 404 includes notification data 406 associated with the current light device activation. The notification data 406 includes, for example, the current location 408 of the vehicle. The notification data 404 optionally includes vehicle type 410. The vehicle type 410 identifies the type of emergency vehicle, such as, but not limited to, police vehicle, fire department vehicle, ambulance, tow truck, etc.

The digital alert notification 404 in some examples includes a recommendation 412 which is optionally presented to the user with the digital alert. The recommendation 412 includes a recommended action 414, such as, but not limited to, a recommendation that the driver pull over to the left side of the road until the emergency vehicle passes by, an instruction to reroute around an accident scene, a recommendation to evacuate an area, a recommendation to seek shelter during a storm or other weather emergency event, etc.

In some examples, the alert manager 126 generates real-time update(s) 416 which are transmitted to the recipients after the initial digital alert notification is sent. The update(s) 416 can include updates on the direction 418 of travel of the emergency vehicle and/or an indication to end an alert when the smart light device is de-activated. The update(s) can also include updated recommendations/actions in addition to the updated vehicle location information.

In other examples, the alert manager 126 includes a navigation manager 422. The navigation manager 422 includes instructions for generating a map 424 including a location of the emergency vehicle and/or an indicator rendered on the map identifying the location of the emergency vehicle on the map. The indicator 426 in some examples is moved along the map to illustrate movements of the emergency vehicle in real-time, further enabling emergency vehicle recipients and non-emergency vehicle recipients to take appropriate action.

Figure 5:
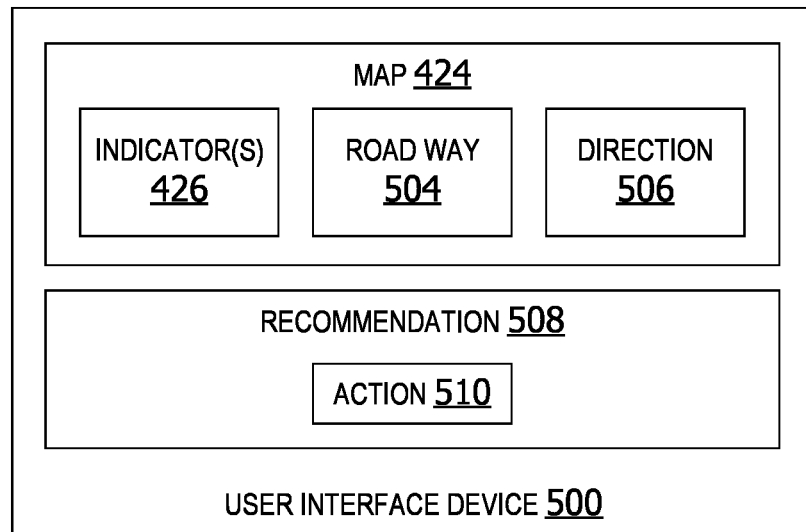
FIG. 5 is an exemplary block diagram illustrating a navigation application providing a digital alert associated with a map displayed on a user interface device.

FIG. 5 is an exemplary block diagram illustrating a navigation application map 424 displayed on a user interface device 500. The user interface device 500 is a device for presenting a digital alert to a user, such as, but not limited to, the UI 140 in FIG. 1 and/or the UI 232 in FIG. 2. In this example, the map 424 includes an emergency vehicle indicator 426 graphic icon representing the current location of the emergency vehicle on the map 424. The map 424 optionally includes illustrations representing the roadway 504 or streets on which the emergency vehicle is traveling and/or the direction 506 of travel. A recommendation 508 including a recommended action 510 is optionally also provided within the display output to the user via the user interface device 500.

Figure 6:
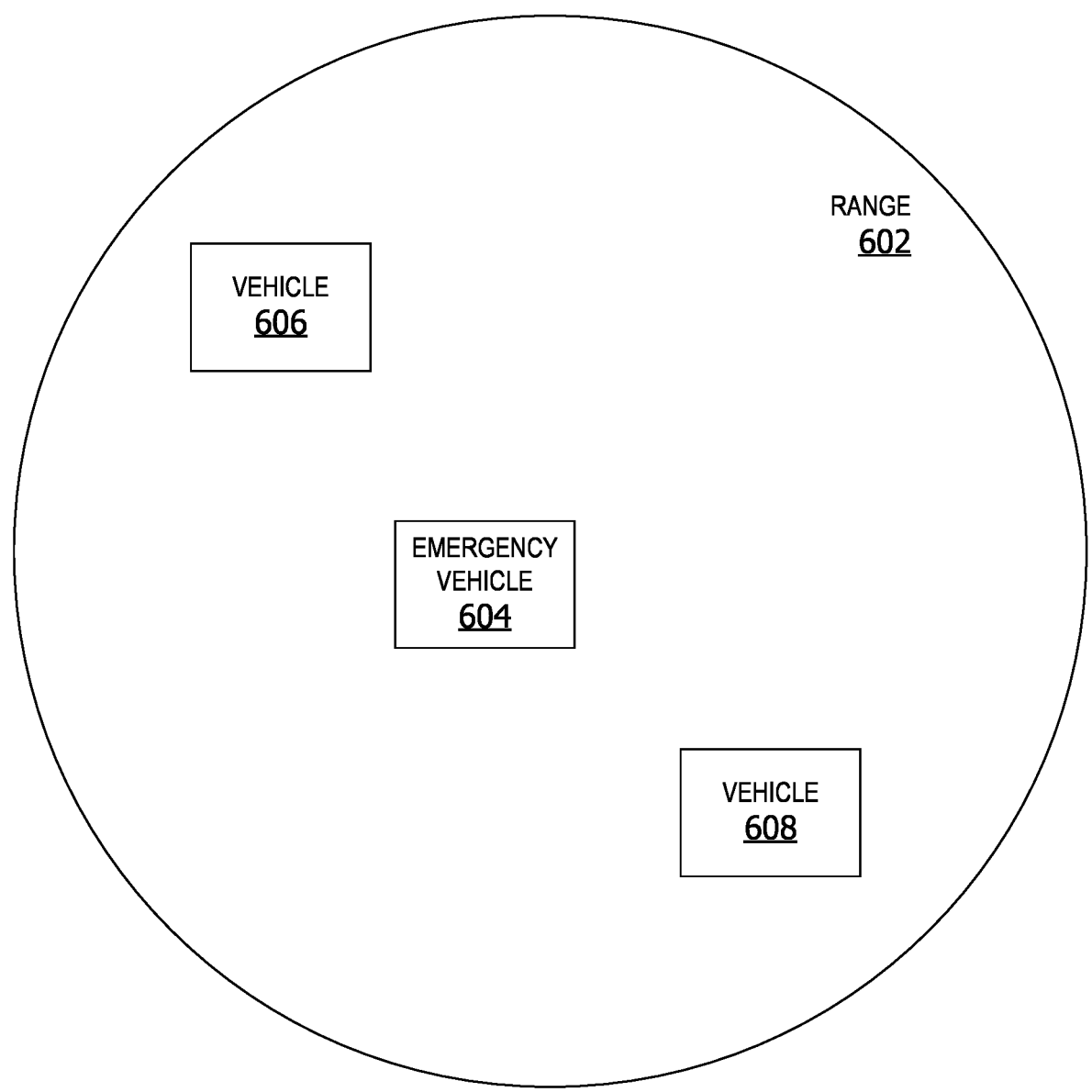
FIG. 6 is an exemplary block diagram illustrating vehicles within a predetermined range of an emergency vehicle receiving digital alerts associated with activation of emergency lights on the emergency vehicle.

Referring now to FIG. 6, an exemplary block diagram illustrating vehicles within a predetermined range 602 of an emergency vehicle 604 receiving digital alerts associated with activation of emergency lights on the emergency vehicle. In this example, the vehicle 606 and the vehicle 608 are located within the predetermined range 602 of the emergency vehicle. The digital alert data is sent to a computing device associated with the vehicle 606 and the vehicle 608 in this example. The digital alert data is used to generate the digital alert on the UI. However, the digital alert data is not sent to the vehicle 610 which is outside the predetermined range 602 of the emergency vehicle 604.

Figure 7:
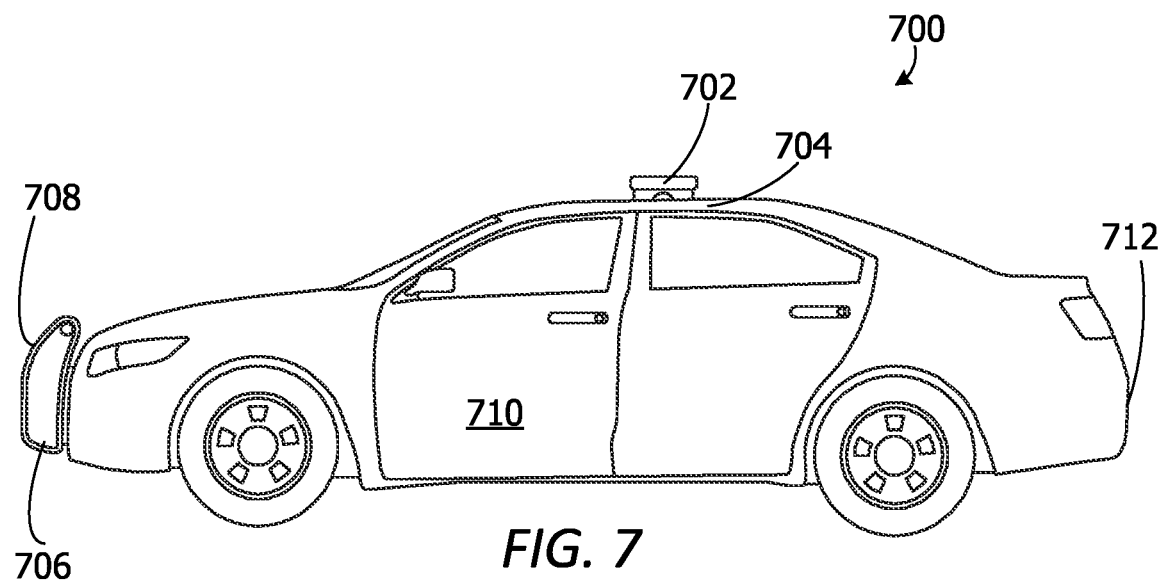
FIG. 7 is an exemplary block diagram illustrating an emergency vehicle sedan having an alert manager generating smart light device activation notifications.

FIG. 7-FIG. 12 are examples of emergency vehicles having a light controller device for transmitting digital alert notifications to recipients. Referring to FIG. 7, an exemplary block diagram illustrating an emergency vehicle sedan 700 having an alert manager generating smart light device activation notifications is shown. In this example, the smart light device includes a multicolored lightbar 702 installed on an exterior surface of a roof 704 of the vehicle. The vehicle sedan 700 can also include a smart light device 706 mounted on or under a front grill 708 of the vehicle. In this example, the vehicle sedan 700 optionally also includes a smart light device mounted to a front grill 708, a door 710, a rear bumper 712 or any other part of the vehicle.

Figure 8:
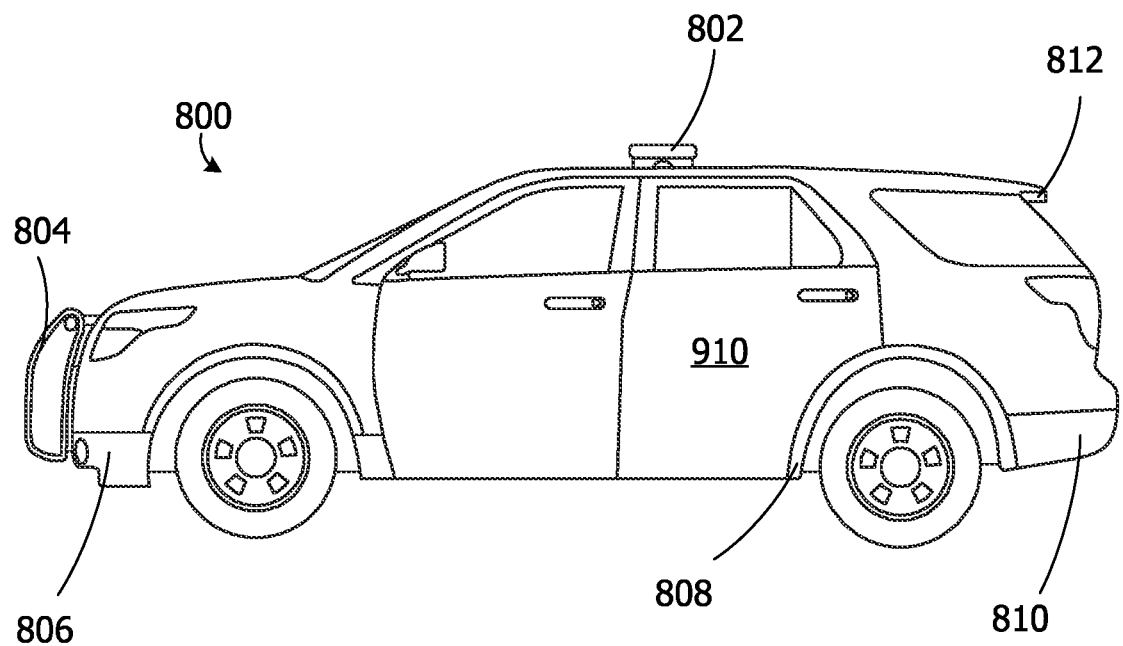
FIG. 8 is an exemplary block diagram illustrating an emergency vehicle sports utility vehicle (SUV) having an alert manager generating smart light device activation notifications.

FIG. 8 is an exemplary block diagram illustrating an emergency vehicle sports utility vehicle (SUV) vehicle 800 having an alert manager generating smart light device activation notifications. In this example, the SUV vehicle 800 includes a smart light device (multicolor LED lightbar) 802 mounted to the roof of the SUV vehicle 800. The vehicle, in this example, also optionally includes a smart light device mounted on a grill 804, a front bumper 806, a wheel rim 808, a rear bumper 810 and/or a back portion 812 of the SUV vehicle 800.

Figure 9:
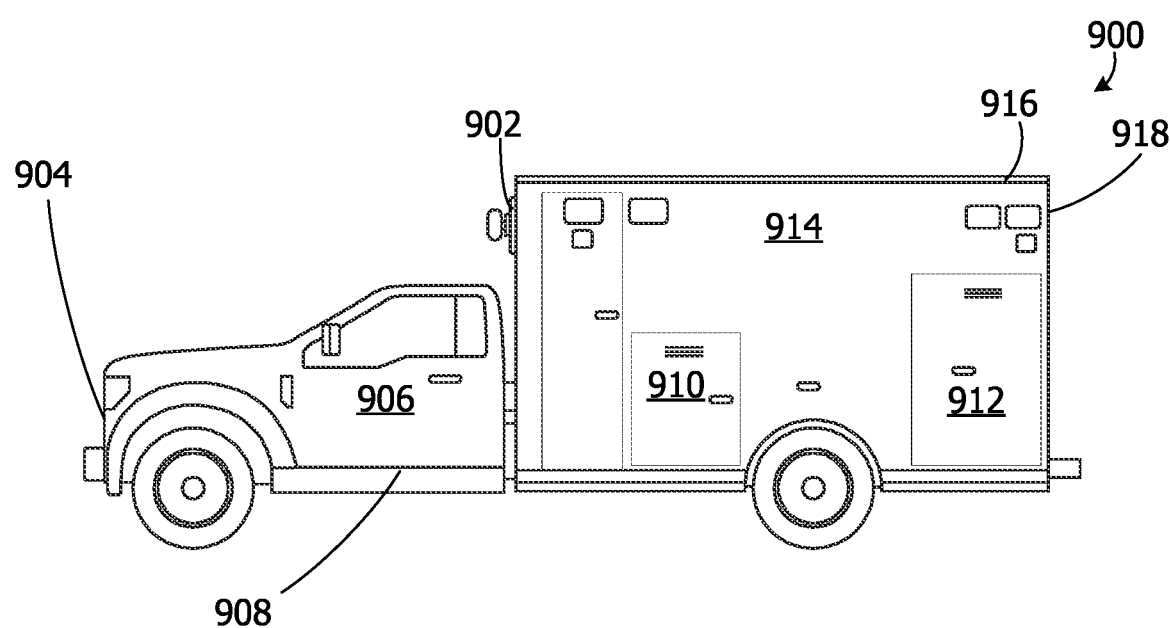
FIG. 9 is an exemplary block diagram illustrating an emergency vehicle truck having an alert manager generating smart light device activation notifications.

FIG. 9 is an exemplary block diagram illustrating an emergency vehicle truck 900 having an alert manager generating smart light device activation notifications. In this example, the truck 900 includes a smart light device 902, which is a multicolor lightbar, mounted to a roof of the emergency vehicle truck 900. The truck 900 optionally includes smart light devices mounted to locations such as, but not limited to, a front bumper 904, a door 906, a running board 908, compartment door 910 and 912, side 914, roof 916, back 918 and/or any other portion of the vehicle truck 900.

Figure 10:
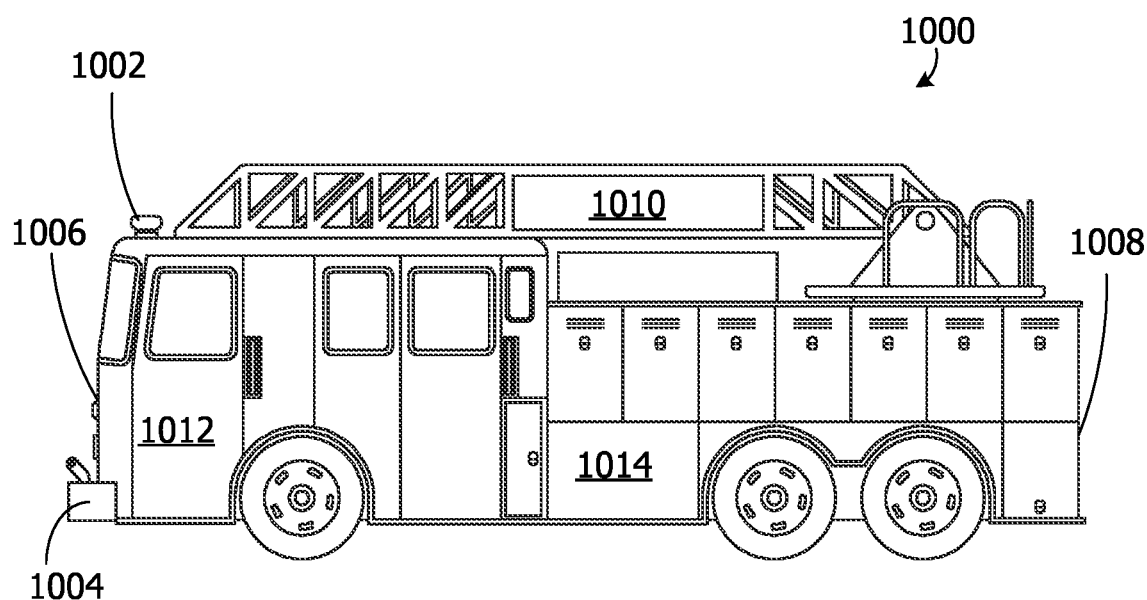
FIG. 10 is an exemplary block diagram illustrating an emergency vehicle firetruck having an alert manager generating smart light device activation notifications.

Turning now to FIG. 10, an exemplary block diagram illustrating an emergency vehicle firetruck 1000 having an alert manager generating smart light device activation notifications is depicted. In this example, a smart light device 1002, which is a multicolor LED lightbar, is mounted to a roof of a firetruck cab. The smart light devices may also be mounted to other locations on the vehicle, such as, but not limited to, the front bumper 1004 or front grill 1006 of the firetruck. Multicolor LED lights can also be mounted on the side 1014, back 1008, ladder 1010 and/or door 1012 of the firetruck 1000.

Figure 11:
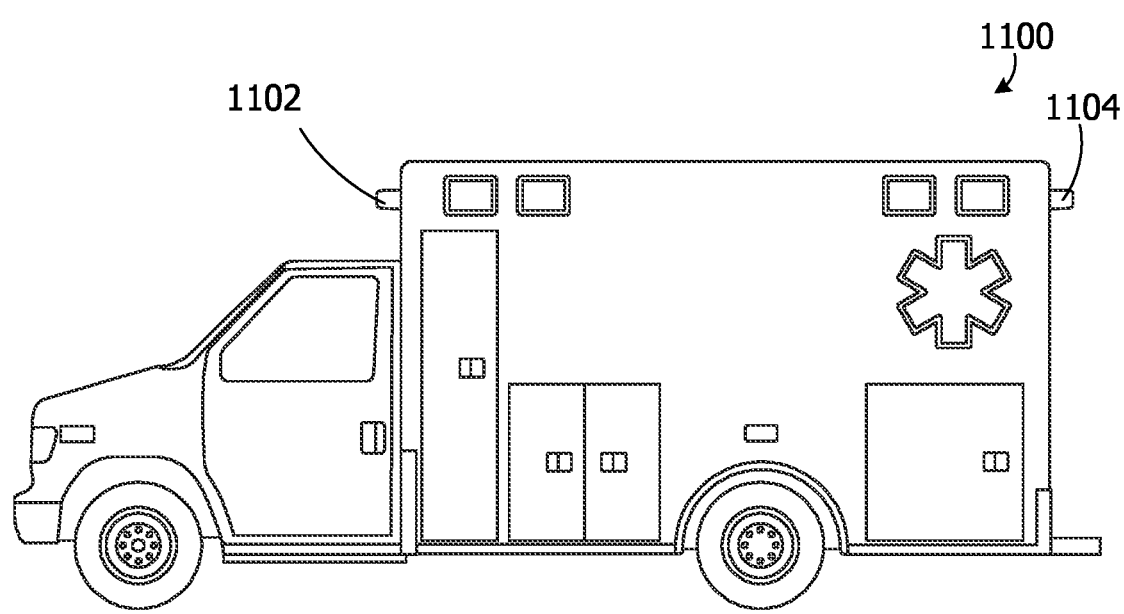
FIG. 11 is an exemplary block diagram illustrating an emergency vehicle ambulance having an alert manager generating smart light device activation notifications.

FIG. 11 is an exemplary block diagram illustrating an emergency vehicle ambulance 1100 having an alert manager generating smart light device activation notifications. In this example, a smart light device 1102, which is a multicolor LED lightbar, is mounted to a front portion of the ambulance above the cab. The ambulance 1100 optionally also includes smart light devices mounted to a back portion 1104 of the ambulance 1100.

Figure 12:
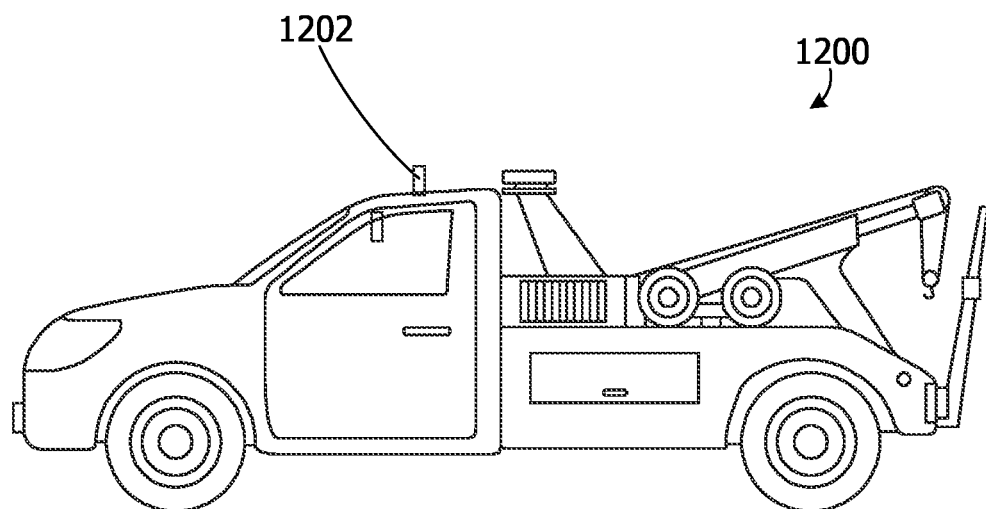
FIG. 12 is an exemplary block diagram illustrating an emergency vehicle tow truck having an alert manager generating smart light device activation notifications.

FIG. 12 is an exemplary block diagram illustrating an emergency vehicle tow truck 1200 having an alert manager generating smart light device activation notifications. The tow truck 1200, in this example, includes a smart light device 1202 mounted to the exterior surface of the roof of the tow truck.

Figure 13:
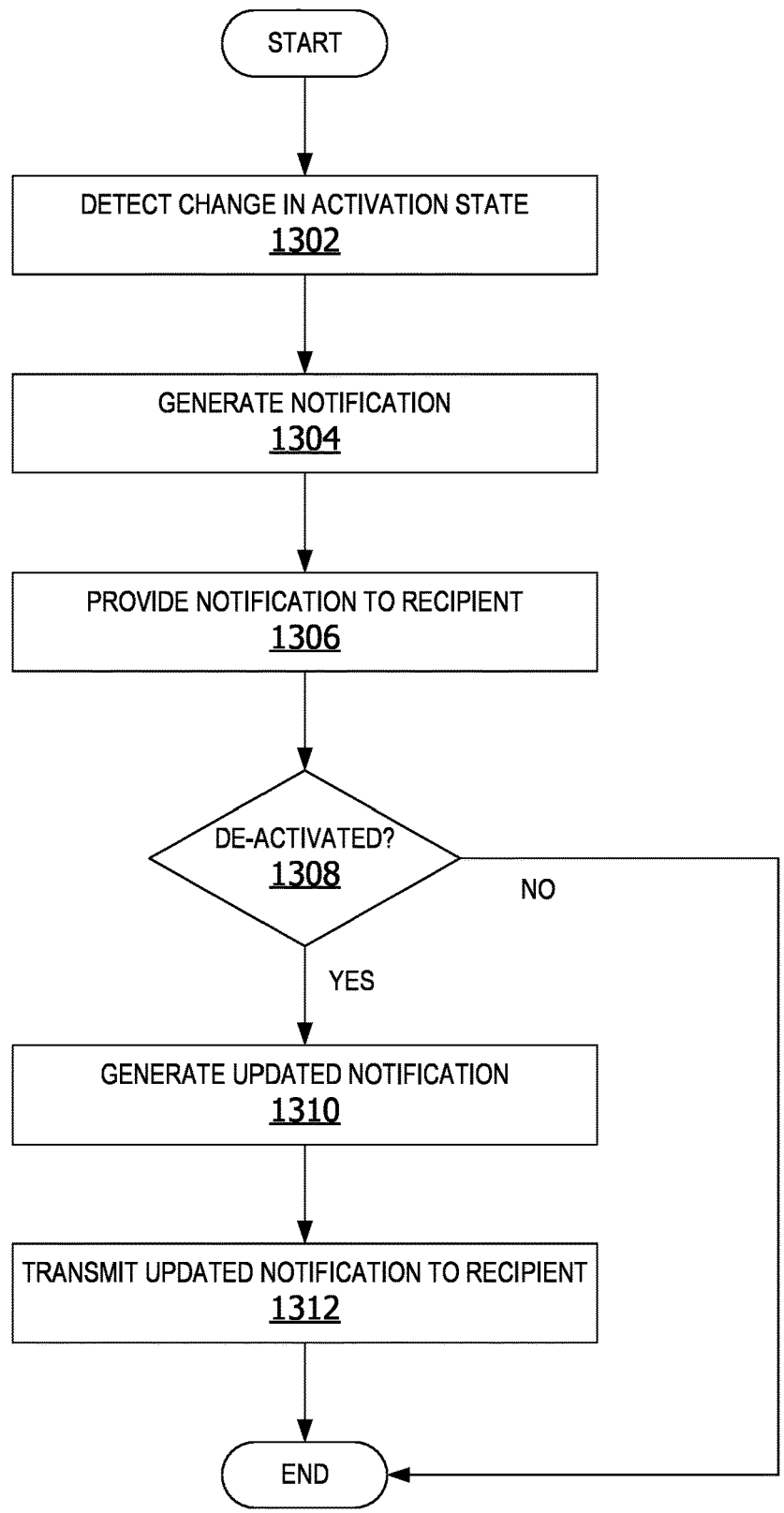
FIG. 13 is an exemplary flow chart illustrating operation of the computing device to generate smart light device activation notifications.

FIG. 13 is an exemplary flow chart illustrating operation of the computing device to generate smart light device activation notifications. The process shown in FIG. 13 is performed by an alert manager executing on a computing device, such as the light controller device 118 in FIG. 1, the light controller device 216 in FIG. 2 or the light controller device 316 in FIG. 3.

The process begins by detecting a change in activation state of a light device at 1302. The alert manager generates a digital alert notification at 1304. The alert manager provides the digital alert notification to a recipient at 1306. The recipient can include an application on a computing device, or a digital alert service hosted on a cloud server, such as the cloud server 138 in FIG. 1. The alert manager determines if the light device is de-activated at 1308. If yes, the alert manager generates an updated notification at 1310. The updated notification includes an indication that the emergency lights are no longer turned on. The alert manager transmits the updated notification to the recipient at 1312. The process terminates thereafter.

Figure 14:
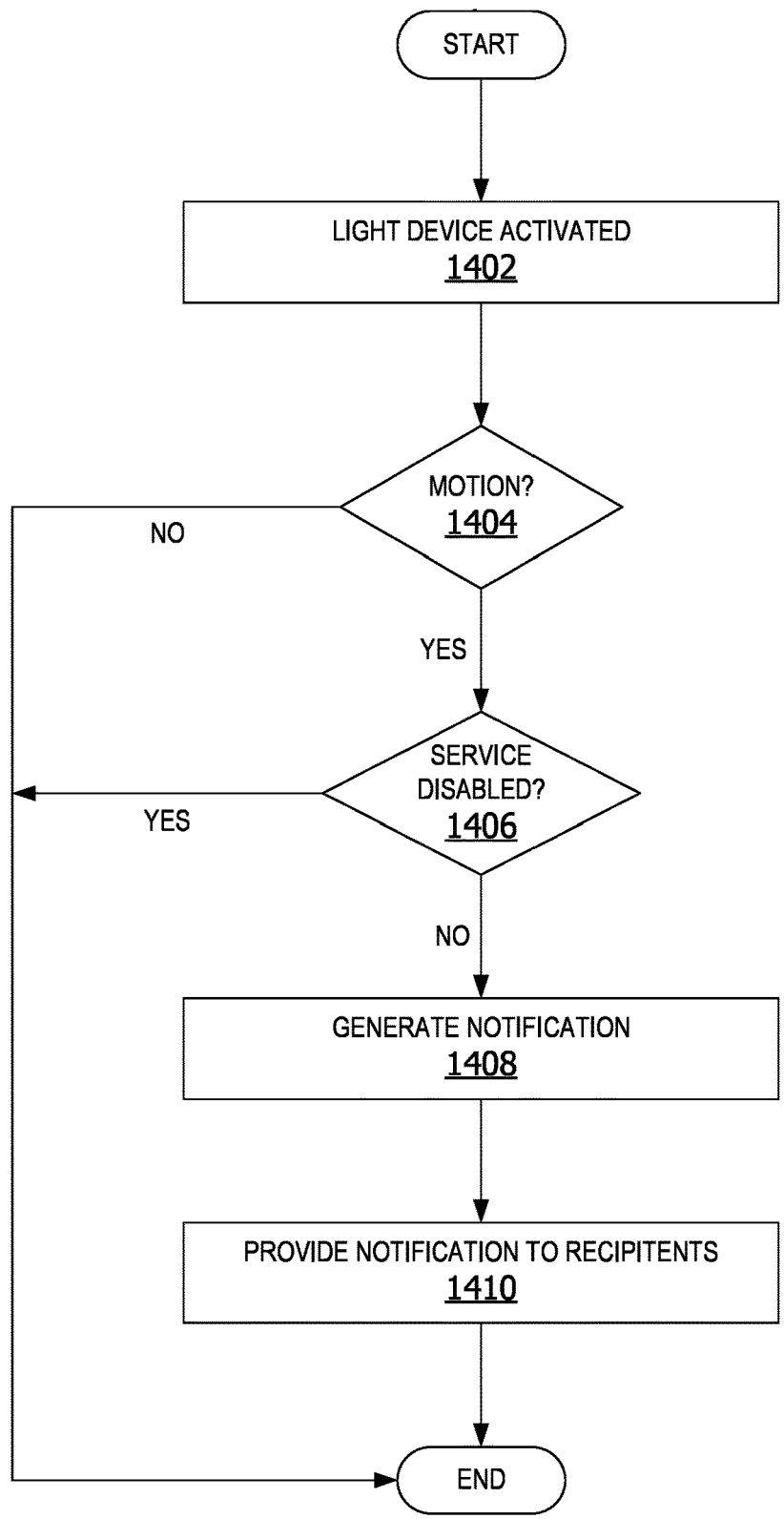
FIG. 14 is an exemplary flow chart illustrating operation of the computing device to provide smart light device activation notifications to recipients.

While the operations illustrated in FIG. 14 are performed by a computing device, aspects of the disclosure contemplate performance of the operations by other entities. In a non-limiting example, a cloud service performs one or more of the operations. In another example, one or more computer-readable storage media storing computer-readable instructions may execute to cause at least one processor to implement the operations illustrated in FIG. 14.

FIG. 14 is an exemplary flow chart illustrating operation of the computing device to provide smart light device activation notifications to recipients. The process shown in FIG. 14 is performed by an alert manager executing on a computing device, such as the light controller device 118 in FIG. 1, the light controller device 216 in FIG. 2 or the light controller device 316 in FIG. 3.

The process begins when a light device is activated at 1402. The alert manager determines if the emergency vehicle is in motion at 1404. If the vehicle is stationary, the process terminates. If the vehicle is in motion, the alert manager determines if the digital alert service is disabled at 1406. The service can be disabled via a manual control, such as pressing a physical switch, clicking a menu option on a graphic UI, or any other known or available means for disabling a function on a device. The alert manager generates a digital alert notification at 1408 if the service is not disabled. The notification is provided to the recipient(s) at 1410. The process terminates thereafter.

While the operations illustrated in FIG. 14 are performed by a computing device, aspects of the disclosure contemplate performance of the operations by other entities. In a non-limiting example, a cloud service performs one or more of the operations. In another example, one or more computer-readable storage media storing computer-readable instructions may execute to cause at least one processor to implement the operations illustrated in FIG. 14.

Additional Examples

In some examples, the emergency vehicle light device includes a network device, such as a cellular chip, wi-fi chip, radio transmitter, or other network device. The network device is incorporated inside the light device or communicatively coupled to the light device via a conversion device that transmits a digital alert notification to one or more recipients via a cellular network, the internet, NFC, wired connection to a network router device, or any other means of wired or wireless communications. In some non-limiting examples, the alert manager optionally transmits the digital alert notification is transmitted via a radio frequency, such as amplitude modulation (AM)/frequency modulation (FM) radio. In other examples, the smart light device includes a wi-fi chip connected to a router within the vehicle.

In an example scenario, the alert manager transmits the digital alert notification to a primary recipient, such as an automobile manufacturer server, when the smart light device is activated. The primary recipient server then transmits the digital alert data to a plurality of secondary recipients, such as computing devices associated with vehicles made or serviced by the automobile manufacturer. For example, if the notification is sent to a digital alert service provider associated with Ford®, the digital alert service provider then transmits the digital alert data to a plurality of secondary recipients such as vehicles manufactured and/or serviced by Ford®. The secondary recipient vehicle computing systems then generate the digital alert using the digital alert data to display the digital alert on a user interface display screen within the vehicle passenger compartment for viewing by the vehicle driver and/or passengers.

In other examples, the primary recipient server transmits the digital alert data to a plurality of recipient computing systems associated with self-driving navigational systems of self-driving vehicles. The digital alert data informs the self-driving navigational systems of the presence of an emergency vehicle within the predetermined range of the self-driving vehicle. The self-driving vehicle navigational systems then take appropriate action to maneuver the self-driving vehicle out of the path of the on-coming emergency vehicle and/or take any other appropriate action given the nature of the emergency type, type of emergency vehicle, current traffic conditions, road conditions, weather conditions, and any other relevant factors.

In an example scenario, turning on an emergency light bar triggers the alert manager to send a digital alert notification to a cloud server via a cellular network. The cloud server is a primary recipient. The cloud server can be a system associated with a third-party, such as a city, vehicle manufacturer, vehicle services provider, mapping/navigation platform, social media platform, mobile device system, or any other type of third-party. In some examples, the cloud platform is accessed by the alert manager via an API or portal page. The cloud server system (cloud infrastructure) identifies secondary recipients currently located within the range of the emergency vehicle and subscribed to receive the digital alerts. The cloud server system transmits digital alert data to the identified secondary recipients (vehicle computing systems and user devices (applications) associated with subscribed users). The recipient computing system (application) receiving the digital alert data renders the digital alert via a user interface for viewing by the user. This enables the system to seamlessly redirect traffic, provide alternative routes, direct drivers to slow down or pull over, provide evacuation instructions, etc. This system can further be utilized by emergency response systems, such as dispatchers, to clear traffic from roads ahead of the arrival of the emergency vehicles. In this manner, an application can be used to redirect vehicles away from the path of oncoming emergency vehicles before the emergency vehicles arrive/enter the street or other roadway for greater efficiency and reduced risk to drivers and other vehicles on the road.

In other examples, the system provides a switch or UI control enabling a driver or other emergency personnel to manually disable the digital alerts. For example, if a firetruck has arrived at the scene of a fire which has already gone out, the driver or other emergency personnel can utilize the controls to manually turn off digital alerts or terminate existing digital alerts which have already been sent out due to the minimal risk or lack of need for digital alerts in the current situation. This provides greater flexibility and control over digital alerts for users.

In an example scenario, a transmitter (nets, work device) within an emergency warning light device on an emergency vehicle sends a signal to a recipient (server/cloud) via a network in response to activation of the light device (turned on). The light device sends a second signal (termination signal) to the recipient when the light device is de-activated (turned off). The second signal informs the recipient computing system that the light device is no longer activated.

In another example scenario, the transmitter within the emergency light device transmits a signal to a recipient computing device when the light device is turned on. The signal is transmitted continuously for as long as the light device is turned on. When the light device is turned off, the signal ceases indicating to the recipient that the emergency is over. In still another example, the signal is a non-continuous signal that is transmitted at regular intervals to the recipient for as long as the light device is turned off. The time interval is any user configurable period of time, such as every second, every five seconds, every minute, every ten minutes, etc. When the light device is turned off, the signal is no longer transmitted to the recipient computing device.

In some examples, the digital alert includes information indicating a number of emergency vehicles in the area. If a single emergency vehicle is approaching the recipient vehicle receiving the digital alert, the digital alert indicates it is a single vehicle. Likewise, if three emergency vehicles are in the area, the digital alert optionally specifies that three emergency vehicles are nearby. The digital alert can also include an indicator of the current location of each emergency vehicle. The alert optionally includes an identification of the type of vehicle (police, fire, ambulance, tow truck, utility vehicle) and/or the type of emergency (medical emergency, fire, weather-related emergency, crime in progress, etc.).

In these examples, if two or more emergency vehicles are traveling within proximity of each other in the same direction, the digital alert informs the recipient that multiple emergency vehicles are within the area. In this examples, the primary recipient receives notification data from multiple emergency vehicles within a predetermined time frame indicating that multiple vehicles are heading in the same direction on the same road and/or are traveling in the same area. The primary recipient includes this additional information in the digital alert which is sent out to the plurality of secondary recipients within range of one or more of the emergency vehicles. In this example, any vehicle within range of at least one emergency vehicle receives a digital alert notification.

In other examples, the digital alerts are provided to both emergency and non-emergency vehicles. This enables the emergency services personnel associated with multiple emergency vehicles to coordinate their activities in a manner that maximizes resource usage while minimizing costs. For example, if an ambulance is responding to a medical emergency associated with a car accident, another emergency vehicle receiving the digital alert notification, such as a police vehicle or fire department vehicle, may reroute to the current location of the ambulance indicated in the digital alert presented to the recipient to assist the ambulance.

Alternatively, or in addition to the other examples described herein, examples include any combination of the following:
- the network device comprises a cellular chip, wherein the notification is transmitted to the remote computing device via a cellular network;
- provide the notification to the remote computing device responsive to the determination the emergency vehicle is in motion;
- the notification is withheld in response to a determination the emergency vehicle is stationary;
- determine whether a digital alert service is activated;
- provide the notification to the remote computing device responsive to determination the digital alert service is activated;
- notifications are withheld responsive to de-activation of the digital alert service;
- transmit the notification to a cloud server, wherein the cloud server provides the digital alert to a plurality of recipients;
- update a navigation application associated with the user interface device;
- the updated navigation application displays the current location of the emergency vehicle to a second user associated with the second vehicle within the predetermined range of the current location of the emergency vehicle;
- detect de-activation of the light device, wherein the light device is turned off;
- generate an update notification indicating resolution of an emergency event associated with the emergency vehicle;
- detecting a change in activation state of a surface mounted light device to an activated state, wherein a set of lights flash in a selected flash pattern in the activated state;
- determining whether the emergency vehicle is in motion;
- generating a notification identifying a current location of the emergency vehicle responsive to determining the emergency vehicle is in motion and the surface mounted light device is in the activated state;
- providing the notification to a selected recipient via a network device of the surface mounted light device;
- wherein a digital alert is displayed on a user interface device associated with a second vehicle within a predetermined range of the emergency vehicle, the digital alert comprising the current location of the emergency vehicle;
- generating a recommended action to be taken by vehicles within the predetermined range of the emergency vehicle, wherein the recommended action is included in the notification provided to the selected recipient;
- transmitting the notification to the cloud server, wherein the cloud server provides the digital alert to a plurality of recipients associated with a plurality of computing devices;
- generating a first notification identifying a first recommended action associated with a first flash pattern of the surface mounted light device;
- generating a second notification identifying a second recommended action associated with a second flash pattern of the surface mounted light device;
- wherein a different recommended action is provided to users within the predetermined range of the emergency vehicle in response to activation of different flash patterns of the surface mounted light device;
- providing the notification to the remote computing device responsive to the determination the emergency vehicle is in motion;
- wherein the notification is withheld in response to a determination the emergency vehicle is stationary;
- providing the notification to the selected recipient responsive to determination a digital alert service is activated, wherein the notification is withheld responsive to de-activation of the digital alert service;
- updating a navigation application associated with the user interface device;
- wherein the updated navigation application displays the current location of the emergency vehicle to a second user associated with the second vehicle within the predetermined range of the current location of the emergency vehicle;
- detect a change in activation state of a surface mounted light device removably mounted to at least a portion of a surface of an emergency vehicle from a de-activated state to an activated state;
- wherein a set of lights flash in a selected flash pattern in the activated state;
- determine whether the emergency vehicle is in motion;
- generate a notification identifying a current location of the emergency vehicle responsive to determining the emergency vehicle is in motion and the surface mounted light device is in the activated state;
- provide the notification to a computing device within a predetermined range of the emergency vehicle;
- wherein the computing device generates a digital alert based on the notification, the digital alert presented to a user via a user interface device associated with the computing device, the digital alert including the current location of the emergency vehicle;
- generate a first notification identifying a first recommended action associated with a first flash pattern of the surface mounted light device;
- generate a second notification identifying a second recommended action associated with a second flash pattern of the surface mounted light device, wherein a different recommended action is provided to users within the predetermined range of the emergency vehicle in response to activation of different flash patterns of the surface mounted light device;

determine whether the emergency vehicle is in motion on a public roadway;

provide the notification to the remote computing device responsive to the determination the emergency vehicle is in motion, wherein the notification is withheld in response to a determination the emergency vehicle is stationary;

determine whether a digital alert service is activated;

provide the notification to the remote computing device responsive to determination the digital alert service is activated, wherein notifications are withheld responsive to de-activation of the digital alert service;

identify a type of emergency and a recommended action with the current location of the emergency vehicle to a user via the user interface device; and display the current location of the emergency vehicle within a map generated by a navigation application, the map identifying a direction of travel of the emergency vehicle.

At least a portion of the functionality of the various elements in FIG. 1, FIG. 2, FIG. 3, FIG. 4, FIG. 5, FIG. 6, FIG. 7, FIG. 8, FIG. 9, FIG. 10, FIG. 11 and FIG. 12 can be performed by other elements in FIG. 1, FIG. 2, FIG. 3, FIG. 4, FIG. 5, FIG. 6, FIG. 7, FIG. 8, FIG. 9, FIG. 10, FIG. 11 and FIG. 12, or an entity (e.g., processor, web service, server, application program, computing device, etc.) not shown in FIG. 1, FIG. 2, FIG. 3, FIG. 4, FIG. 5, FIG. 6, FIG. 7, FIG. 8, FIG. 9, FIG. 10, FIG. 11 and FIG. 12.

In some examples, the operations illustrated in FIG. 13 and FIG. 14 can be implemented as software instructions encoded on a computer-readable medium, in hardware programmed or designed to perform the operations, or both. For example, aspects of the disclosure can be implemented as a system on a chip or other circuitry including a plurality of interconnected, electrically conductive elements.

In other examples, a computer readable medium having instructions recorded thereon which when executed by a computer device cause the computer device to cooperate in performing a method of providing digital alerts associated with activation of emergency lights on an emergency vehicle, the method comprising detecting a change in activation state of a surface mounted light device to an activated state, wherein a set of lights flash in a selected flash pattern in the activated state; determining whether the emergency vehicle is in motion; generating a notification identifying a current location of the emergency vehicle responsive to determining the emergency vehicle is in motion and the surface mounted light device is in the activated state; and providing the notification to a selected recipient via a network device of the surface mounted light device, wherein a digital alert is displayed on a user interface device associated with a second vehicle within a predetermined range of the emergency vehicle, the digital alert comprising the current location of the emergency vehicle.

While the aspects of the disclosure have been described in terms of various examples with their associated operations, a person skilled in the art would appreciate that a combination of operations from any number of different examples is also within scope of the aspects of the disclosure.

The term "Wi-Fi" as used herein refers, in some examples, to a wireless local area network using high frequency radio signals for the transmission of data. The term "BLUETOOTH®" as used herein refers, in some examples, to a wireless technology standard for exchanging data over short distances using short wavelength radio transmission. The term "cellular" as used herein refers, in some examples, to a wireless communication system using short-range radio stations that, when joined together, enable the transmission of data over a wide geographic area. The term "NFC" as used herein refers, in some examples, to a short-range high frequency wireless communication technology for the exchange of data over short distances.

While no personally identifiable information is tracked by aspects of the disclosure, examples have been described with reference to data monitored and/or collected from the users. In some examples, notice is provided to the users of the collection of the data (e.g., via a dialog box or preference setting) and users are given the opportunity to give or deny consent for the monitoring and/or collection. The consent can take the form of opt-in consent or opt-out consent.

Exemplary Operating Environment

Exemplary computer-readable media include flash memory drives, digital versatile discs (DVDs), compact discs (CDs), floppy disks, and tape cassettes. By way of example and not limitation, computer-readable media comprise computer storage media and communication media. Computer storage media include volatile and nonvolatile, removable, and non-removable media implemented in any method or technology for storage of information such as computer-readable instructions, data structures, program modules and the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, and other solid-state memory. In contrast, communication media typically embody computer-readable instructions, data structures, program modules, or the like, in a modulated data signal such as a carrier wave or other transport mechanism and include any information delivery media.

Although described in connection with an exemplary computing system environment, examples of the disclosure are capable of implementation with numerous other special purpose computing system environments, configurations, or devices.

Examples of well-known computing systems, environments, and/or configurations that can be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. Such systems or devices can accept input from the user in any way, including from input devices such as a keyboard or pointing device, via gesture input, proximity input (such as by hovering), and/or via voice input.

Examples of the disclosure can be described in the general context of computer-executable instructions, such as program modules, executed by one or more computers or other devices in software, firmware, hardware, or a combination thereof. The computer-executable instructions can be organized into one or more computer-executable components or modules. Generally, program modules include, but are not limited to, routines, programs, objects, components, and data structures that perform tasks or implement abstract data types. Aspects of the disclosure can be implemented with any number and organization of such components or modules. For example, aspects of the disclosure are not limited to the specific computer-executable instructions, or the specific components or modules illustrated in the figures and described herein. Other examples of the disclosure can include different computer-executable instructions or components having more functionality or less functionality than illustrated and described herein.

In examples involving a general-purpose computer, aspects of the disclosure transform the general-purpose computer into a special-purpose computing device when configured to execute the instructions described herein.

The examples illustrated and described herein as well as examples not specifically described herein but within the scope of aspects of the disclosure constitute exemplary means for providing digital alerts associated with smart light device activation. For example, the elements illustrated in FIG. 1, FIG. 2, FIG. 3, FIG. 4, FIG. 5, FIG. 6, FIG. 7, FIG. 8, FIG. 9, FIG. 10, FIG. 11 and FIG. 12, such as when encoded to perform the operations illustrated in FIG. 13 and FIG. 14, constitute exemplary means for detecting a change in activation state of a surface mounted light device to an activated state; exemplary means for determining whether the emergency vehicle is in motion; exemplary means for generating a notification identifying a current location of the emergency vehicle responsive to determining the emergency vehicle is in motion and the surface mounted light device is in the activated state; and exemplary means for providing the notification to a selected recipient via a network device of the surface mounted light device, wherein a digital alert is displayed on a user interface device associated with a second vehicle within a predetermined range of the emergency vehicle, the digital alert comprising the current location of the emergency vehicle.

Other non-limiting examples provide one or more computer storage devices having a first computer-executable instructions stored thereon for providing smart light device activation digital alerts. When executed by a computer, the computer performs operations including detect a change of an activation state of the light device from a de-activated state to an activated state, wherein the light device flashes at least one LED light in the set of LED lights in a user-selected flash pattern when the light device is in the activated state; generate a notification identifying a current location of the emergency vehicle and a recommended action to be taken by any vehicles within a predetermined range of the emergency vehicle responsive to detecting the change in the activation state of the light device; and provide the notification to a remote computing device via the network device of the light device, wherein a digital alert is displayed on a user interface device associated with a second vehicle within the predetermined range of the emergency vehicle, the digital alert comprising the current location of the emergency vehicle and the recommended action.

The order of execution or performance of the operations in examples of the disclosure illustrated and described herein is not essential, unless otherwise specified. That is, the operations can be performed in any order, unless otherwise specified, and examples of the disclosure can include additional or fewer operations than those disclosed herein. For example, it is contemplated that executing or performing an operation before, contemporaneously with, or after another operation is within the scope of aspects of the disclosure.

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used shall only be interpreted as indicating exclusive alternatives (i.e., "one or the other but not both") when preceded by terms of exclusivity, such as "either" "one of" "only one of" or "exactly one of." "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The use of "including," "comprising," "having," "containing," "involving," and variations thereof, is meant to encompass the items listed thereafter and additional items.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system for providing digital alerts corresponding to emergency vehicle light device activations, the system comprising:
    a light device removably attached to at least a portion of a surface of an emergency vehicle, the light device comprising a set of light emitting diode (LED) lights;
    a light controller device communicatively coupled to the light device, the light controller device further comprising a network device and a memory communicatively coupled to a processor, the memory comprising computer-readable instructions configured to, with the processor, implement an alert manager, to cause the processor to:
        detect a change of an activation state of the light device from a de-activated state to an activated state, wherein the light device flashes at least one LED light in the set of LED lights in a user-selected flash pattern when the light device is in the activated state;
        determine whether the emergency vehicle is in motion;
        generate a notification identifying a current location of the emergency vehicle responsive to detecting the change in the activation state of the light device and determining the emergency vehicle is in motion, wherein the notification is withheld in response to a determination the emergency vehicle is stationary; and
        provide the notification to a remote computing device via the network device, wherein notification data associated with the notification is utilized to generate a digital alert associated with the emergency vehicle, the digital alert is displayed via a user interface device associated with a second vehicle.

2. The system of claim 1, wherein the network device comprises a cellular chip, wherein the notification is transmitted to the remote computing device via a cellular network.

3. The system of claim 1, wherein the instructions are further operative to:
    generate a recommended action to be taken by vehicles within a predetermined range of the emergency vehicle, wherein the notification includes the current location of the emergency vehicle and the recommended action.

4. The system of claim 1, wherein the instructions are further operative to:
    determine whether a digital alert service is activated; and
    provide the notification to the remote computing device responsive to determination the digital alert service is activated, wherein notifications are withheld responsive to de-activation of the digital alert service.

5. The system of claim 1, wherein the instructions are further operative to:
    transmit the notification to a cloud server associated with a primary recipient, wherein the cloud server provides the digital alert to a plurality of secondary recipients.

6. The system of claim 1, wherein the instructions are further operative to:
    update a navigation application associated with the user interface device, wherein the navigation application displays the current location of the emergency vehicle to a second user associated with the second vehicle within a predetermined range of a current location of the emergency vehicle.

7. The system of claim 1, wherein the instructions are further operative to:
    detect de-activation of the light device, wherein the light device is turned off; and
    generate an update notification indicating resolution of an emergency event associated with the emergency vehicle.

8. A method for providing digital alerts corresponding to emergency vehicle light device activations, the method comprising:
    detecting a change in activation state of a smart light device to an activated state, wherein a set of LED lights flash in a selected flash pattern in the activated state;
    determining whether the emergency vehicle is in motion;
    generating a notification identifying a current location of the emergency vehicle responsive to determining the emergency vehicle is in motion and the smart light device is in the activated state, wherein the notification is withheld in response to a determination the emergency vehicle is stationary; and
    providing the notification to a selected recipient via a network device of the smart light device, wherein a digital alert is displayed on a user interface device associated with a second vehicle within a predetermined range of the emergency vehicle, the digital alert comprising the current location of the emergency vehicle.

9. The method of claim 8, further comprising:
    generating a recommended action to be taken by vehicles within the predetermined range of the emergency vehicle, wherein the recommended action is included in the notification provided to the selected recipient.

10. The method of claim 8, wherein the selected recipient is a cloud server, and further comprising:
    transmitting the notification to the cloud server, wherein the cloud server provides the digital alert to a plurality of recipients associated with a plurality of computing devices.

11. The method of claim 8, further comprising:
    generating a first notification identifying a first recommended action associated with a first flash pattern of the smart light device; and
    generating a second notification identifying a second recommended action associated with a second flash pattern of the smart light device, wherein a different recommended action is provided to users within the predetermined range of the emergency vehicle in response to activation of different flash patterns of the smart light device.

12. The method of claim 8, further comprising:
    providing the notification to a remote computing device responsive to the determination the emergency vehicle is in motion.

13. The method of claim 8, further comprising:
    providing the notification to the selected recipient responsive to determination a digital alert service is activated, wherein the notification is withheld responsive to de-activation of the digital alert service.

14. The method of claim 8, further comprising:
updating a navigation application associated with the user interface device, wherein the navigation application displays the current location of the emergency vehicle to a second user associated with the second vehicle within the predetermined range of the current location of the emergency vehicle.

15. One or more computer storage devices having computer-executable instructions stored thereon, which, upon execution by a computer, cause the computer to perform operations comprising:
    detect a change in activation state of a light device removably mounted to at least a portion of a surface of an emergency vehicle from a de-activated state to an activated state, wherein a set of LED lights flash in a selected flash pattern in the activated state;
    determine whether the emergency vehicle is in motion;
    generate a notification identifying a current location of the emergency vehicle in response to the detected change in activation state and determining the emergency vehicle is in motion, wherein the notification is withheld in response to a determination the emergency vehicle is stationary; and
    provide the notification to a computing device within a predetermined range of the emergency vehicle, wherein the computing device generates a digital alert based on the notification, the digital alert presented to a user via a user interface device associated with the computing device, the digital alert including the current location of the emergency vehicle.

16. The one or more computer storage devices of claim 15, wherein the operations further comprise:
    generate a first notification identifying a first recommended action associated with a first flash pattern of the light device; and
    generate a second notification identifying a second recommended action associated with a second flash pattern of the light device, wherein a different recommended action is provided to users within the predetermined range of the emergency vehicle in response to activation of different flash patterns of the light device.

17. The one or more computer storage devices of claim 15, wherein the set of LED lights of the light device comprises quad color LED lights capable of flashing four different colors.

18. The one or more computer storage devices of claim 15, wherein the operations further comprise:
    determine whether a digital alert service is activated; and
    provide the notification to a remote computing device responsive to determination the digital alert service is activated, wherein notifications are withheld responsive to de-activation of the digital alert service.

19. The one or more computer storage devices of claim 15, wherein the operations further comprise:
    identify a type of emergency and a recommended action with the current location of the emergency vehicle to a user via the user interface device.

20. The one or more computer storage devices of claim 15, wherein the operations further comprise:
    display the current location of the emergency vehicle within a map generated by a navigation application, the map identifying a direction of travel of the emergency vehicle.

\* \* \* \* \*